(12) United States Patent
Bernabe et al.

(10) Patent No.: US 12,301,759 B1
(45) Date of Patent: May 13, 2025

(54) CONTACT CENTER ROUTING BASED ON AGENT ROUTING SCORES

(71) Applicant: Zoom Communications, Inc., San Jose, CA (US)

(72) Inventors: William Thomas Bernabe, Northborough, MA (US); Benjamin Joseph DeStephen, Hilliard, OH (US); Kausar Maqbool Hassan, Cary, NC (US); Michael Ian Stromar, Rocklin, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/306,160

(22) Filed: Apr. 24, 2023

(51) Int. Cl.
  *H04M 3/00* (2024.01)
  *H04M 3/22* (2006.01)
  *H04M 3/51* (2006.01)
  *H04M 3/523* (2006.01)

(52) U.S. Cl.
  CPC ....... *H04M 3/5232* (2013.01); *H04M 3/2227* (2013.01); *H04M 3/5175* (2013.01); *H04M 2203/05* (2013.01)

(58) Field of Classification Search
  CPC . H04M 3/5232; H04M 3/2227; H04M 3/5175
  See application file for complete search history.

(56) References Cited

U.S. PATENT DOCUMENTS

| | | | |
|---|---|---|---|
| 6,141,325 A | 10/2000 | Gerstel | |
| 6,639,982 B1 | 10/2003 | Stuart et al. | |
| 6,959,078 B1 | 10/2005 | Eilbacher et al. | |
| 8,180,043 B2 * | 5/2012 | Dezonno | H04M 3/5232 379/265.11 |
| 8,718,271 B2 | 5/2014 | Spottiswoode | |
| 9,648,164 B1 | 5/2017 | Harris | |
| 9,654,641 B1 | 5/2017 | Chishti et al. | |
| 10,681,214 B1 | 6/2020 | Serero et al. | |
| 11,425,250 B1 | 8/2022 | Cessna et al. | |
| 11,636,360 B1 | 4/2023 | Mishra et al. | |

(Continued)

OTHER PUBLICATIONS

Aircall, How to Choose the Best Call Management Software: Everything You Need to Know, Emily Gregor, https://aircall.io/blog/call-center/how-to-choose-the-best-call-management-software/, Sep. 7, 2022, 12 pages.

*Primary Examiner* — Rasha S Al Aubaidi
(74) *Attorney, Agent, or Firm* — Young Basile Hanlon & MacFarlane, P.C.

(57) ABSTRACT

A contact center request is received from a user device. Respective agent routing scores for the available agents are determined based on respective environmental scores and respective network connection scores associated with available agents. An agent is selected from the available agents based on the respective agent routing scores. The contact center request is routed to an agent device of the agent. A network connection score for an agent can be determined by obtaining from a network monitoring tool available at the agent device network related metrics, which include at least one of a packet loss metric, a jitter metric, a throughput metric, or a latency metric. The network related metrics are combined to obtain a score that in a range of 0 to a maximum network-related score.

20 Claims, 15 Drawing Sheets

(56) References Cited

U.S. PATENT DOCUMENTS

| | | |
|---|---|---|
| 2004/0252823 A1* | 12/2004 | Becerra ............... H04M 3/5235 |
| | | 379/265.01 |
| 2005/0135593 A1 | 6/2005 | Becerra et al. |
| 2005/0220288 A1 | 10/2005 | Huey |
| 2008/0025493 A1 | 1/2008 | Paras et al. |
| 2009/0323921 A1 | 12/2009 | Spottiswoode et al. |
| 2010/0014511 A1 | 1/2010 | Ezerzer et al. |
| 2010/0189250 A1 | 7/2010 | Williams et al. |
| 2010/0278315 A1 | 11/2010 | Goldman et al. |
| 2013/0223612 A1 | 8/2013 | Flockhart et al. |
| 2014/0046858 A1 | 2/2014 | Werner |
| 2014/0355749 A1 | 12/2014 | Conway et al. |
| 2015/0092930 A1* | 4/2015 | Mullen ............... H04M 3/4936 |
| | | 379/88.01 |
| 2015/0103999 A1 | 4/2015 | Nowak et al. |
| 2016/0036972 A1 | 2/2016 | Ristock et al. |
| 2016/0219142 A1 | 7/2016 | Brown |
| 2018/0034965 A1 | 2/2018 | te Booij et al. |
| 2018/0300385 A1 | 10/2018 | Merriman et al. |
| 2020/0313985 A1* | 10/2020 | Jayakumar ............. H04L 41/14 |
| 2021/0344800 A1 | 11/2021 | Shwartz et al. |
| 2021/0383803 A1 | 12/2021 | Takimoto |
| 2023/0128837 A1 | 4/2023 | Hu et al. |

\* cited by examiner

CONTACT CENTER ROUTING BASED ON AGENT ROUTING SCORES

FIELD

This disclosure relates to contact center routing and, more specifically, to identifying an optimal agent or a group of agents to whom to route a contact center request.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
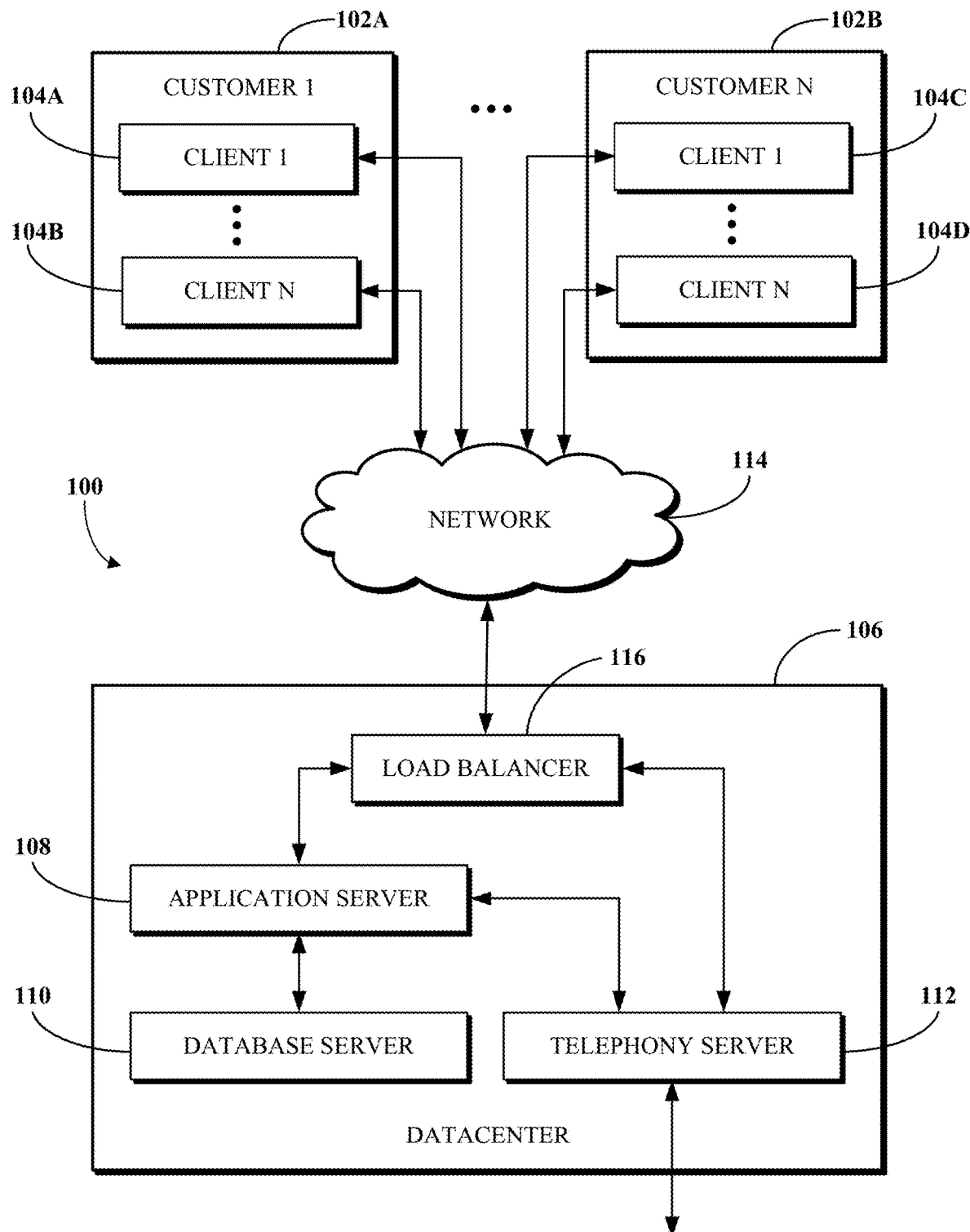
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

An incoming request into a contact center is referred to herein as a "contact center request." A contact center request is thus a request from an end user of the contact center (i.e., a contact center user) to have an interaction. A contact center request that has been routed to an agent such that the agent is communicating with the user is referred to herein as "an engagement;" and "a completed engagement" refers to an engagement that has been terminated (e.g., completed), such as when the agent is no longer communicating with the user. A contact center request can be based on any of a variety of reasons. In some examples, a contact center request may be to ask relatively basic service—or product-related questions. In other examples, a contact center request may focus on a nuanced issue specific to the contact center user. In some cases, all contact center agents of a given contact center may be deployed to address all categories of contact center requests. Typically, however, a contact center will deploy agents into groups (e.g., agent groups) defined to cover specific categories of contact center requests and/or modalities. In such a typical case, a routing system is used to direct contact center requests to the proper contact center agent.

Agents or agent groups may be associated with (e.g., assigned to) queues. A contact center queue can be thought of as a list of requests to be processed where incoming contact center requests (such as phone calls, emails, chats, or social media messages) may be held until an agent becomes available to handle them. A queue can be used to manage and prioritize user requests, ensuring that they are handled according to some priority order or policy and assigning them to the most appropriate agent for resolution. Contact center requests may be routed to a queue based on a set of predetermined rules, such as the nature of the request, the type (e.g., modality) of interaction, the skill level of available agents, and/or the priority level of the customer. Once an agent becomes available, a next queued request may be automatically distributed to them. That an agent is handling a contact center request from a user can mean that the agent is engaged with the user to address the contact center request.

In a conventional contact center configuration, a contact center user initiates a contact center request, the request may be placed in (i.e., routed to) a queue selected from amongst multiple queues, and an agent assigned to the queue can be selected to handle the request. A request may be queued in the case that no agents are available to immediately handle the request. If an agent is available, then the contact center request can be directly routed to an available agent associated with the queue.

Conventional contact center routing may rely upon information provided by contact center users as requests are processed by a contact center system. For example, over the telephony modality, a contact center system may present an interactive voice response (IVR) menu for the contact center user to navigate. Responses to the IVR menu prompts input by the contact center user are used to direct a request from the contact center user to the proper queue or proper agent. For example, the information provided with respect to a contact center request can be used to filter the available agents to a subset of agents having particular skills identified based on the provided information and which agents can be targets for receiving the incoming contact center request. To illustrate, a contact center user may indicate that they are initiating a contact center request because they require help with a password reset and that they are a Spanish speaker. Such information can be used by the contact center system to route the request to a queue dedicated to receiving requests for general Information Technology (IT) support and the agents associated with the queue may be filtered to those who can speak Spanish.

As multiple agents may be identified to handle an incoming contact center request, conventional contact center routing may use different static, pre-configured rules for assigning a contact center request to particular agents. Under a "longest idle" policy, an incoming request can be delivered to the agent who has been idle for the longest time. Idle time may be measured from the time that the agent completed the most recent engagement that the agent handled. Under a "sequential" policy, incoming contact center requests are routed to agents in the order that the requests are received. Under a "rotating" policy, contact center requests are assigned to agents in a round-robin fashion.

Such routing policies (e.g., routing based on skills and statically defined rules) have drawbacks. For example, such routing policies do not incorporate routing based on other factors that may contribute to improving the customer experience, routing so as to prevent degraded customer experiences, routing that improves (e.g., optimizes) resource (e.g., network resource or datacenters) utilization of the contact center provider, routing that reduces monetary costs associated with agents, and other considerations or metrics, as further described herein.

A contact center according to implementations of this disclosure addresses problems such as these by receiving and/or identifying data (e.g., conditions, metrics, scores, factors) relevant to routing of contact center requests and incorporating such data into routing decisions (e.g., policies) of contact center requests to agents or to prioritize agents (e.g., group agents into tiers) for routing decisions. As further described herein, the data can include one or more of agent device telemetry data, local conditions (such as weather or emergency conditions) at locales of agents, monetary cost data associated with agents, proximity of agents to a customer from whom a contact center request is received, and/or other data as described herein.

In an example, contact center requests are received at respective customer datacenters. The contact center requests can be routed to respective agent datacenters resulting in respective engagements. Each engagement may use a respective customer datacenter and a respective agent datacenter. Respective scores can be associated with the respective engagements based on the respective customer datacenters and the respective agent datacenters used by the respective engagements. An aggregation of the respective scores can then be output. In an example, a contact center request may be received from a user device. Respective sets of characteristics associated with respective agent devices can be determined. The contact center request can be routed to an agent device of the respective agent devices based on the respective sets of characteristics.

In an example, a contact center request may be received. Respective indications of agent costs may be obtained for available agents. The contact center request can be routed to an agent device of an agent of the available agents based on the respective indications of the agent costs. The respective indications of the agent costs can be obtained by calling a configured callback function that receives at least an indication of an agent of the available agents and outputs the respective indication of the agent cost for the agent. In an example, a contact center request may be received from a user device. Respective agent routing scores for the available agents can be determined based on respective environmental scores and respective network connection scores associated with available agents. An agent can be selected from the available agents based on the respective agent routing scores. The contact center request can then be routed to an agent device of the agent.

In an example, a contact center request may be received at a customer datacenter. Respective factors for available agents including agent-specific factors, environmental factors, and agent-cost factors can be determined. Respective weights for the respective factors can be obtained. At least one agent of the available agents can be selected based on the respective weights. The contact center request can then be routed to the at least one agent. In an example, a contact center request may be received from an end user device. Respective noise data can be obtained from agent devices associated with agents. An agent can be selected from a subset of the agents based on the respective noise data. The end user device can then be connected to an agent device of the agent.

To describe some implementations in greater detail, reference is first made to examples of hardware and software structures used to implement contact center routing such as by identifying optimal agents or groups of agents to route contact center requests to, as described herein. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
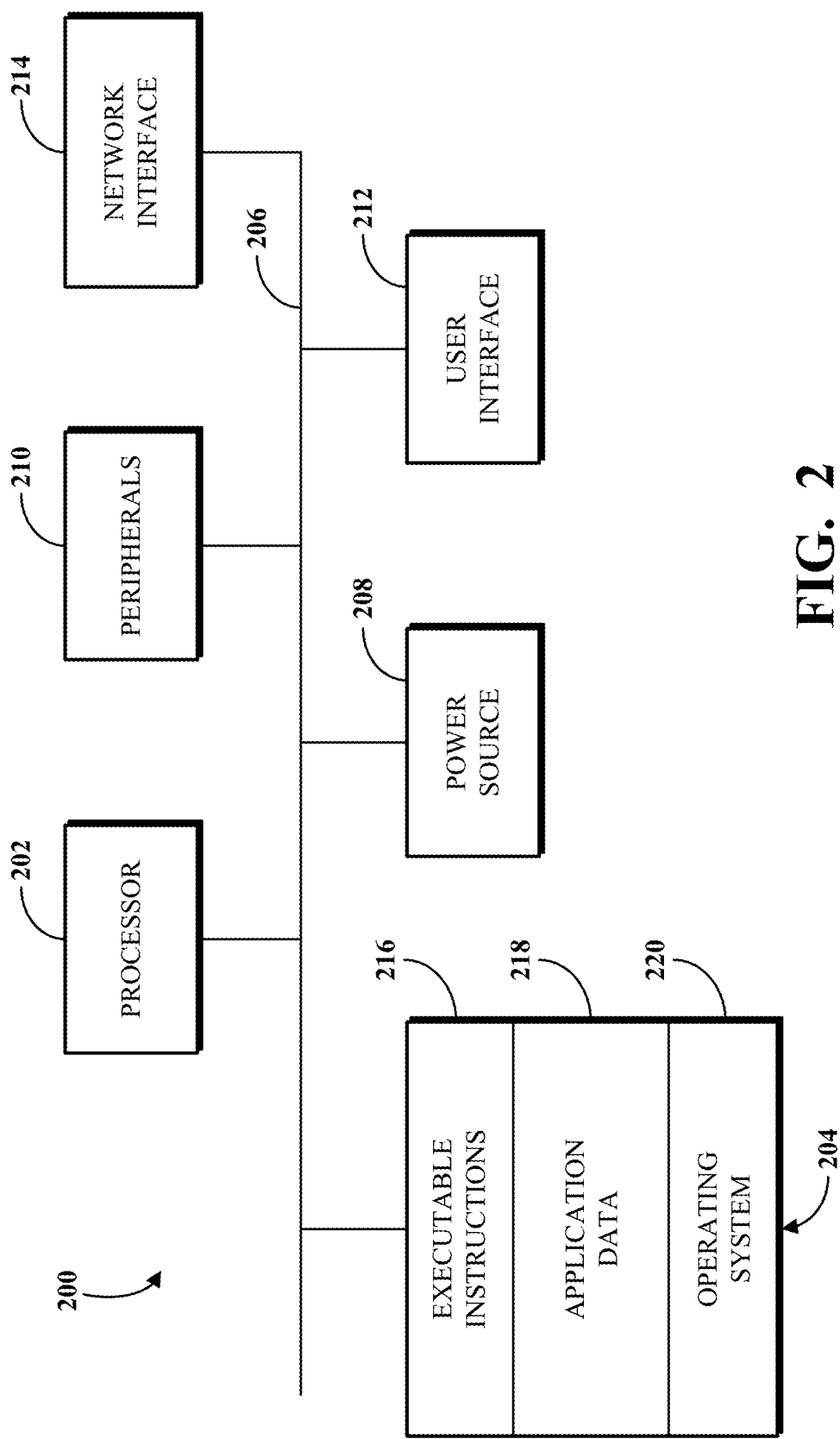
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
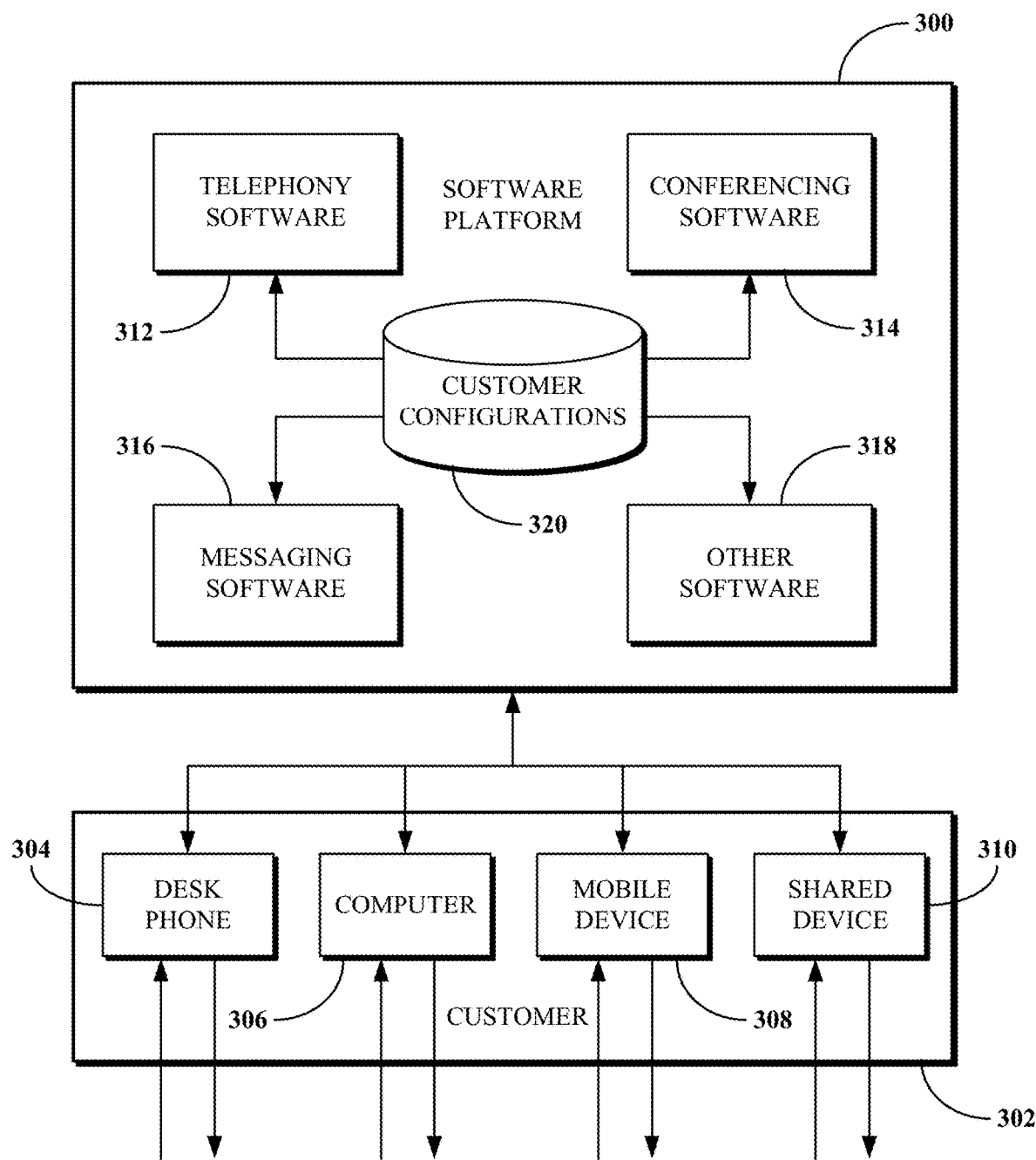
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In particular examples, the other software 318 can include contact center software, for example, one or more of software for calculating and using contact center agent-routing efficiency scores, software for avoiding routing of contact center requests to poor environments, software for contact center routing based on agent cost, software for contact center routing based on agent routing scores, software for dynamic routing of contact center requests, or software for contact center routing based on noise data.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
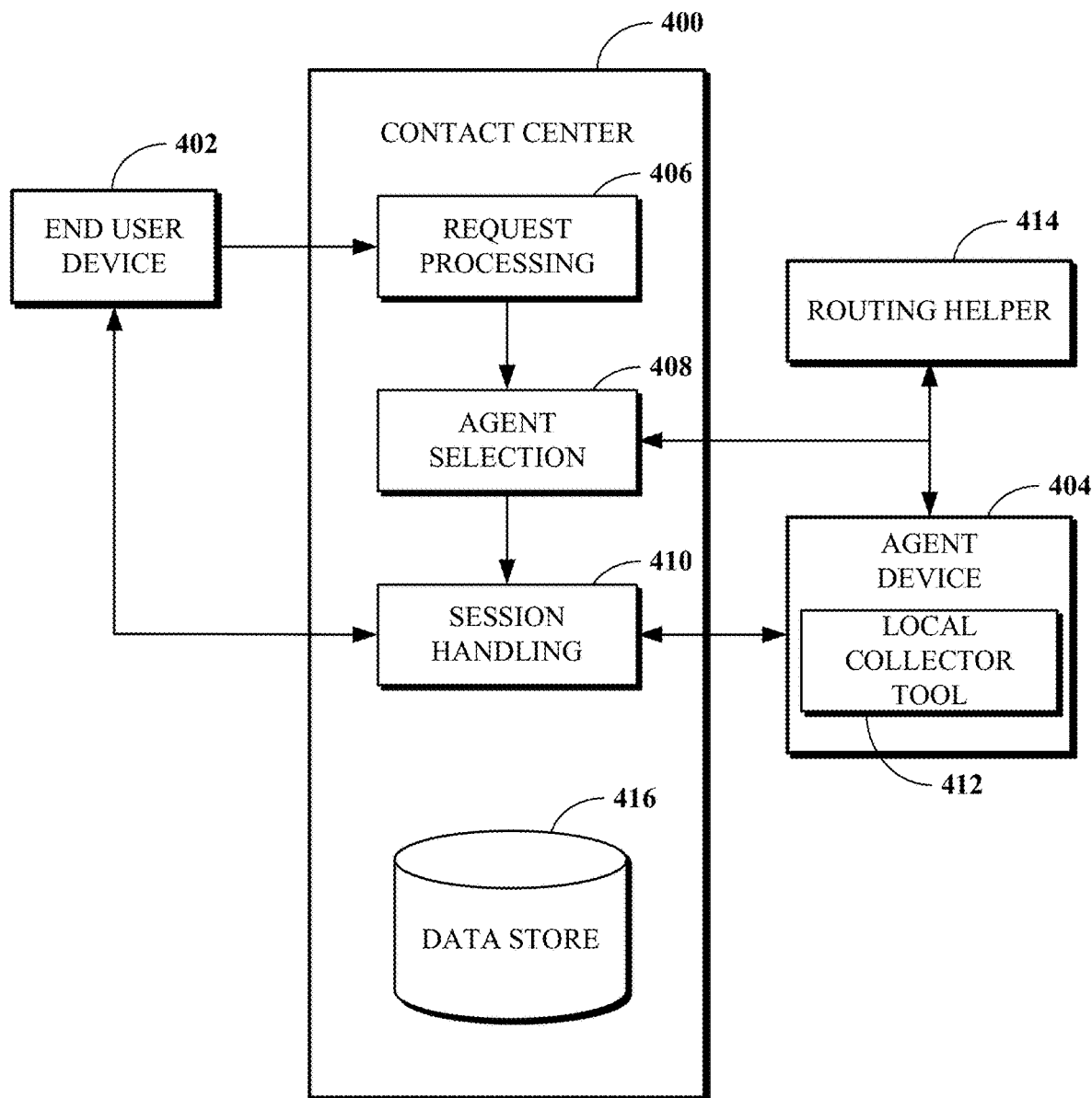
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400. The contact center 400 is accessed by the user device 402 when a contact center request is received from the user device 402. As mentioned above, an engagement is established with the user device 402 is connected to (e.g., is communicating with) the agent device 404.

The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a contact center request initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated.

For example, for the telephony modality, the request processing software 406 may use an IVR menu to prompt the user of the user device to present information associated with the purpose of the request, such as by identifying a category or sub-category of support requested. In another example, for the video modality, the request processing software 406 may use a form or other interactive user interface (e.g., a graphical user interface) to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over multiple modalities. For example, a contact center agent may be part of a first agent group that handles accounting-related requests over all of the telephony, video, chat, text, and social media modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The agent selection software 408 uses one or more inputs to select a contact center agent to handle the request. For example, to select the contact center agent, the agent selection software 408 can use output of the request processing software 406, data received from agent devices (such as the agent device 404) or environment tools therein (such as a local collector tool 412), data received from one or more routing helpers (such as a routing helper 414), other inputs as further described with respect to FIG. 5, or a combination thereof. Selecting a contact center agent includes selecting an agent group to handle a contact center request, queuing the contact center request for the agent group, and routing the contact center request to one of the contact center agents of the agent group, such as in response to determining that the agent is available.

With respect to the output of the request processing software 406, which can include the information associated with the request, the contact center agent may be a human agent or a non-human agent, for example, a chat bot or other bot. The agent selection software 408 may first determine an agent group associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

The request processing software 406 may perform input collection to obtain user input associated with the user request, which may also be referred to as a contact center engagement request. Subject to the particular modality associated with the user request, input collection can use one or more of an IVR menu system, a web form or series of web forms, a prompt for spoken or typed language, or the like to obtain the user input from the user device. Input collection may be implemented as a first or otherwise early part of the contact center engagement process. For example, the initial prompts presented to the user device responsive to the user request being received by the contact center 400 may be presented to the user device by the request processing software 406 for user input collection. Alternatively, input collection may be or otherwise represent a software process used to obtain user input provided from the user device in response to prompting by another software process. In some implementations, the prompts presented to the user device 402 based on the user request may be selected based on the user request and/or information associated with the user device 402.

The local collector tool 412 may execute or be implemented at the agent device 404 to provide data usable by the agent selection software 408 in selecting the contact center agent to handle the request. The local collector tool 412 may be implemented as or be one or more tools. The local collector tool 412 can be used to collect characteristics related the physical environment where the agent device 404 is located or characteristics related of the agent device 404 itself.

In an example, the local collector tool 412 may provide noise data of the environment of the agent device 404 to the agent selection software 408. In an example, the local collector tool 412 may use one or more sensors (e.g., a microphone) of the agent device 404 to obtain sound data from the environment of the agent device 404. The local collector tool 412 may process (e.g., analyze) the sound data to obtain the noise data. The noise data may include a noise level, a noise frequency, or both. In an example, the noise level may be indicated as one of several noise levels. The noise levels may, for example, be in the range of 0 to 10. However, other ways of indicating the noise levels are possible. In an example, the noise frequency may be indicated as one of several noise frequencies. The noise frequency may be indicated as an ordinal value indicating one of "constant," "intermittent," or "transient." However, other ways of indicating the noise frequencies are possible.

In an example, the local collector tool 412 may provide the characteristics to the agent selection software 408 on a recurring basis (e.g., every 5 or 10 minutes). In an example, the local collector tool 412 may provide the characteristics when an agent completes an engagement. By providing the characteristics at the end of an engagement, the agent selection software 408 need not obtain the characteristics in response to receiving a contact center request. In an example, the local collector tool 412 may provide the characteristics to the agent selection software 408 in response to a request for the characteristics from the agent selection software 408. In an example, the characteristics can be transmitted to the agent selection software 408 in response to determining that a value of a transmitted characteristic has changed since the last transmitted value of the characteristic.

The local collector tool 412 may be or include a telemetry tool that can be used to obtain device telemetry data (i.e., the characteristics of the agent device 404 itself provided). The device telemetry data may include one or more of processor utilization, memory utilization, whether a camera is available and operational, whether a sound output device (e.g., a speaker or headset) is available and operational, or whether a sound input device (e.g., a microphone) is available and operational.

In an example, the telemetry data can alternatively or additionally include network-related data. The network-related data may be collected by a network tool, which can be another tool of the local collector tool 412. In an example, the network-related data may include at least some of packet-loss data, jitter data, latency data, or throughput data. In an example, the network tool may collect the network-related data on a recurring basis. In an example, the network tool may collect the network-related data on a recurring basis (e.g., every 500 milliseconds) while the agent device is in an engagement. When the engagement terminates, the network-related data (e.g., an aggregation, such as averages, or sums therefor) may be transmitted to the agent selection software 408. In an example, the network-related data may be transmitted to the agent selection software 408 after a Z (where Z is a positive integer) number of engagements have completed.

Similar to the characteristics related to the physical environment, the telemetry data can be transmitted to the agent selection software 408 on a recurring basis, at the end of an engagement, in response to a request from the agent selection software 408, or in response to determining a change since the last transmitted telemetry data.

The routing helper 414 provides data or services usable by the agent selection software 408 in selecting the contact center agent to handle the request. The routing helper 414 can be one or more tools or software. In an example, a routing helper may be implemented or executed in the contact center 400. In an example, the routing helper 414 can provide agent cost data, as further described with respect to FIG. 5. In an example, the routing helper 414 can provide locale data, as further described with respect to FIG. 5. In an example, the routing helper 414 can be a custom tool or service (i.e., specifically implemented) to provide data or services (e.g., services that provide data) that a particular contact center provider deems relevant (e.g., important) for use by the agent selection software 408 such that the data or services improve the agent routing decisions of the contact center 400.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a contact center request which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

A data store 416 can be used to store data usable for agent routing. The data store 416 can store engagement-related data, such agent datacenters and customer datacenters used in engagements. The data store 416 can include data regarding queues and agents associated with the queues. The data store 416 can include survey data. The data store 416 can include other data as further described herein.

Figure 5:
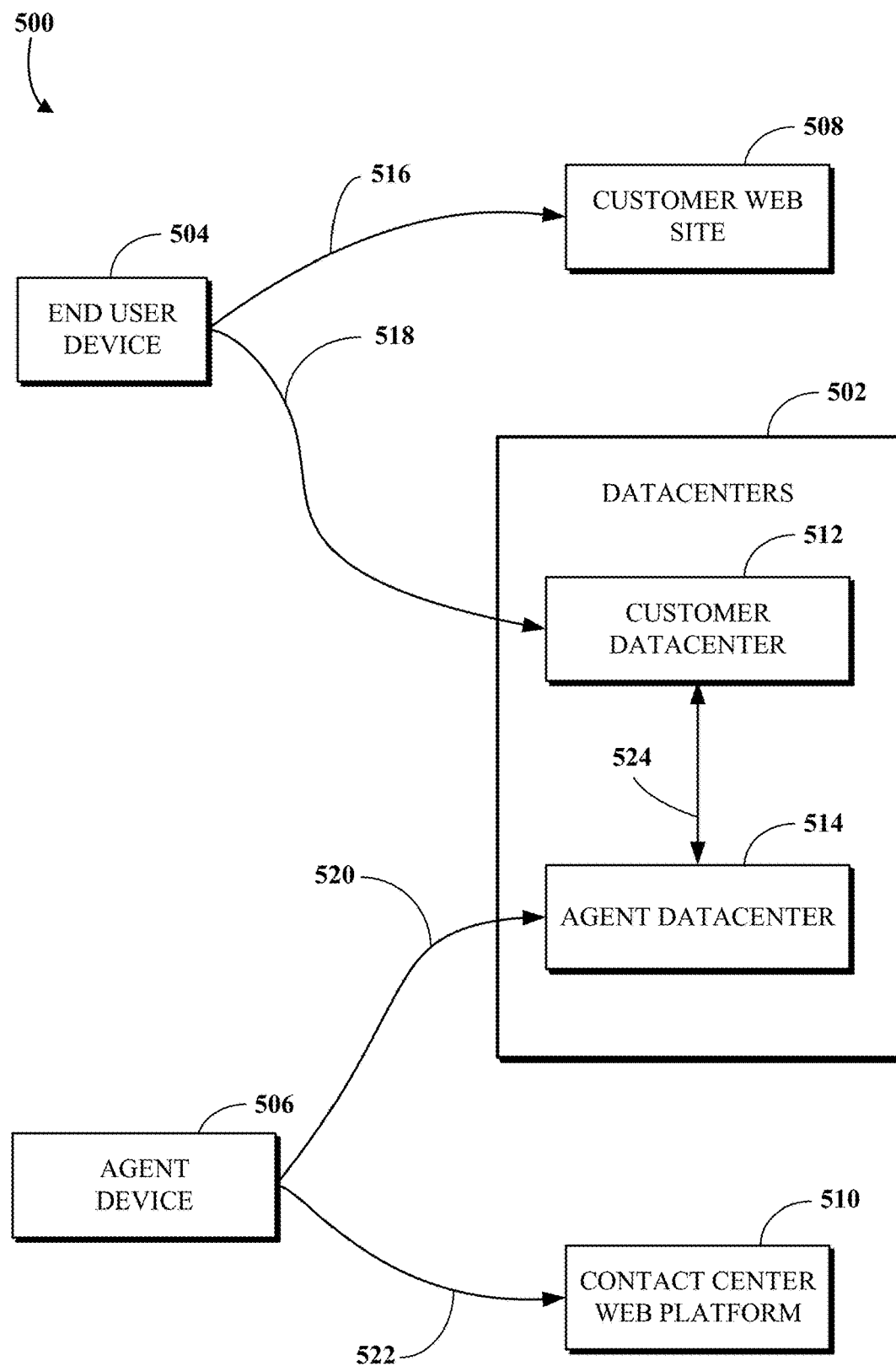
FIG. 5 is a block diagram of an example of datacenters that may be used by customer center engagements.

FIG. 5 is a block diagram 500 of an example of datacenters that may be used by customer center engagements. A contact center service (such as a service used to implement the contact center 400 of FIG. 4) may include, utilize, or deploy a set of datacenters 502. Each of the datacenters included in the set of datacenters 502 can be as described with respect to the datacenter 106 of FIG. 1. A service provider may deploy datacenters in physical proximity to agents and customers in order to improve the experience of the customers. The set of datacenters 502 is shown as including two datacenters (i.e., a customer datacenter 512 and an agent datacenter 514). However, the set of datacenters 502 can include many more datacenters. The customer datacenter 512 and the agent datacenter 514 are so labeled (i.e., "customer datacenter" and "agent datacenter") for ease of reference as will become apparent from the following description.

A "customer datacenter" refers to a datacenter that, as indicated by a connection 518, the contact center service may connect the end user device 504 to, or that the end user device 504 may connect to, such as for the purpose of transmitting and receiving real-time media (e.g., audio and video data) between the end user device 504 and the agent device 506. An "agent datacenter" refers to a datacenter that the contact center service may connect the agent device 506 to (as indicated by a connection 520), such as for the purpose of transmitting and receiving the real-time media between the end user device 504 and the agent device 506 when the end user device 504 is connected to the agent device 506 in the engagement. In some situations, the customer datacenter 512 and the agent datacenter 514 may be a same datacenter, as described herein with respect to intra-datacenter engagements.

An agent may perform their contact center duties from a single physical location (e.g., their home or office) or be a traveling agent. A traveling agent refers to an agent who may have different physical locations in different days (e.g., in different shifts). To illustrate, on a first day, an agent may connect to the contact center web platform 510 from Michigan; and on a second day, the agent may connect from Florida. As such, the agent device 506 may be connected to different agent datacenters for different work sessions (e.g., shifts).

An end user device 504, which may be the user device 402 of FIG. 4, is used to establish a connection between the end user device 504 and an agent device 506, which may be the agent device 404 of FIG. 4. A customer (e.g., a user of the end user device 504) may initiate a contact center request in any number of ways. FIG. 5 illustrates an example where the customer initiates the contact center request via a customer website 508, as indicated by a connection 516. The connection 516 can be used to provide or implement, what is referred to herein as, client control. While FIG. 5 illustrates that the customer website 508 is separate from the set of datacenters 502, that need not be the case and the customer website 508 may be hosted by, or available via, one of the datacenters of the set of datacenters 502. When an engagement terminates, the customer may use the connection 516 to provide post-engagement feedback (such as by filling out a survey to rate the agent, their experience with the contact center, or to provide additional information to the agent). Such post-engagement feedback may be stored in a data store, such as the data store 416 of FIG. 4 and is referred to herein as end user survey data.

An agent, using the agent device 506, may indicate their availability to receive (e.g., handle) contact center requests via an interaction with a contact center web platform 510. For example, at the start of their shift, an agent may use the contact center web platform 510, as indicated by a connection 522, to log on therewith indicating that they are ready to receive contact center requests. At the end of an engagement, the agent may use the connection 522 to provide post-engagement information (such as to associate notes, provide feedback, or document next steps) with respect to the engagement. Such post-engagement information may be stored in a data store, such as the data store 416 of FIG. 4. The connection 522 can be used to provide, what is referred to herein as, agent control.

As already alluded to, the contact center connects the agent device 506 to the agent datacenter 514 to facilitate the exchange of real time communications. To reduce latency, the contact center may connect the agent device 506 to a datacenter (i.e., the agent datacenter 514) that is as close to the location of the agent device 506 as possible to maintain quality in real-time communications. On other hand, agent control need not be provided via a datacenter that is as close as possible to the agent device 506. As such, agent control may be said to globalized or regionalized whereas media pathing (i.e., transmission or routing of video or audio data) may be localized.

Similarly, the contact center connects the end user device 504 to the customer datacenter 512 to facilitate the exchange of real time communications. To reduce latency, the contact center may connect the end user device 504 to a datacenter (i.e., the customer datacenter 512) that is as close to the location of the end user device 504 as possible to maintain quality in real-time communications. On other hand, customer control need not be provided via a datacenter that is as close as possible to the end user device 504. As such, customer control may be said to globalized or regionalized whereas media pathing may be localized. Media are transmitted between the customer datacenter 512 and the agent datacenter 514 over a connection 524, which may use infrastructures one or more networks of one or more communication providers (such as internet service providers or network providers).

As can be appreciated, agents may located globally, and customers connecting to the contact center may also be located globally. Costs are associated with connecting real-time communications across different regions. To connect an agent to an agent datacenter and a customer to customer datacenter, an underlying infrastructure may be used, such as the infrastructure of a network provider. As such, the contact center provider incurs infrastructure costs in providing contact center services. As such, whereas some of costs may be agent or customer facing and non-qualitative (such as latency), other costs can be operational and are realized by the contact center provider. As such, it is desirable to maximize the efficiency of use of the datacenters of the contact center.

In an example, datacenters may be associated with regions. A datacenter may be associated with more than one region. In an example, the datacenters may be grouped into regions based on one or more criteria. Associations between datacenters and regions can be stored in a datastore, such as the data store 416 of FIG. 4. At least one of the criteria may relate to the communications between the datacenters, such as costs per megabyte of data, latency, or available bandwidth therebetween. However, the disclosure is not so limited and the contact center provider may associate the datacenters of the contact center with regions based on any desirable criteria. For example, the datacenters may be associated with (e.g., grouped into) regions based on local considerations at the locales of the datacenters. To illustrate, such local considerations may include languages spoken, dialects, events, sports preferences, or weather conditions.

An engagement that uses the same datacenter for a customer datacenter and an agent datacenter is referred to herein as an intra-datacenter engagement. An engagement that uses a customer datacenter and an agent datacenter that are in a same region is referred to herein as an intra-region engagement. An engagement that uses a customer datacenter and an agent datacenter that are in different regions is referred to herein as an inter-region engagement.

To illustrate, assume that the set of datacenters 502 includes a San Jose datacenter (i.e., a datacenter physically located in the city of San Jose, California, USA), a Denver datacenter (i.e., a datacenter physically located in the city of Denver, Colorado, USA), and a Melbourne datacenter (i.e., a datacenter physically located in the city of Melbourne, Victoria, Australia). Assume further that the contact center provider has associated the San Jose datacenter and the Denver datacenter with a same region (e.g., a region labeled "Western USA region"). A first engagement where the customer datacenter 512 and the agent datacenter 514 are the San Jose datacenter is an intra-datacenter engagement; a second engagement where the customer datacenter 512 is the San Jose datacenter and the agent datacenter 514 is the Denver datacenter is an intra-region engagement; and a third engagement where the customer datacenter 512 is the San Jose datacenter and the agent datacenter 514 is the Melbourne datacenter is an inter-region engagement.

Figure 6:
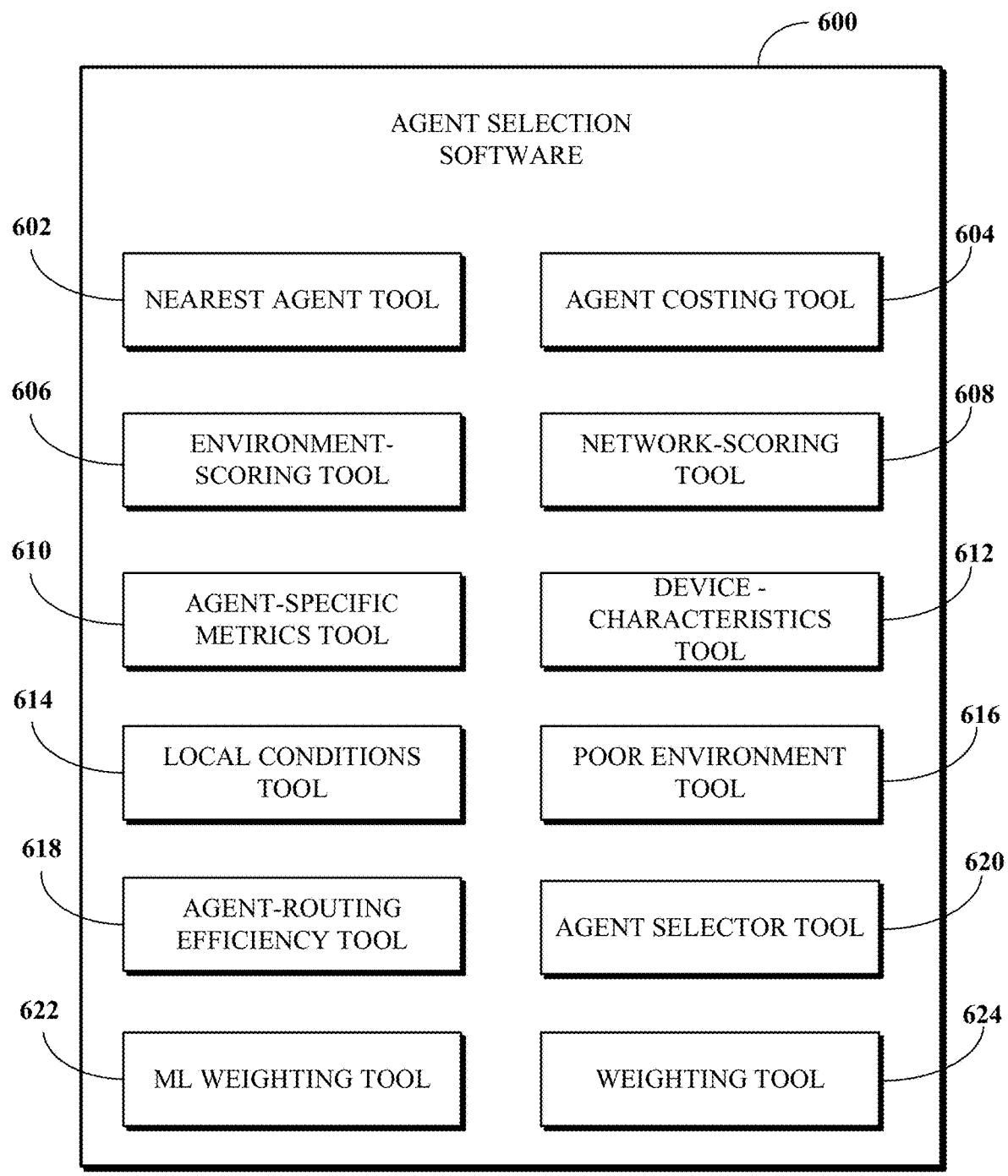
FIG. 6 is a block diagram of example functionality of an agent selection software.

FIG. 6 is a block diagram of example functionality of an agent selection software 600, which may be, for example, the agent selection software 408 of FIG. 4. The agent selection software 600 may be included in or work in conjunction with a software platform, such as the contact center 400 of FIG. 4. The agent selection software 600 includes tools, such as programs, subprograms, functions, routines, subroutines, operations, executable instructions, and/or the like for, inter alia and as further described below, routing contact center requests to agents, identifying (such as be ranking) agents to route contact center requests to agents, and/or obtaining data relevant to routing and using the data to calculate variables (e.g., metrics or scores) usable routing contact center requests to agents). As described with respect to FIG. 4, the agent selection software 600 may be included in a software platform that provides communications services. For simplicity of explanation, statements such as "connecting a customer to an agent" should be understood to mean "connecting an end user device of the customer to the agent device of the agent;" and "the agent (customer) location" should be understood to mean "the location of the device of the agent (customer)."

At least some of the tools of the agent selection software 600 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the agent selection software 600 includes a nearest-agent tool 602, an agent-costing tool 604, an environment-scoring tool 606, a network-scoring tool 608, an agent-specific metrics tool 610, a device-characteristics tool 612, a local conditions tool 614, a poor environment tool 616, an agent-routing efficiency tool 618, an agent selector tool 620, a machine-learning (ML) weighting tool 622, and a weighting tool 624. In some implementations, the agent selection software 600 can include more or fewer tools. In some implementations, some of the tools may be combined, some of the tools may be split into more tools, or a combination thereof. Each of the tools can be used separately, in conjunction with other one or more other tools, for such purpose. Some configurations of the agent selection software 600 may include a subset of the tools 602-624.

The nearest-agent tool 602 can use respective connectivity information of available agents and a customer to obtain rankings of the available agents with respect to a contact center request received from the customer. The rankings can be used, such as by the agent selector tool 620, to connect the customer (i.e., the end user device of the customer) to a geographically closest agent (i.e., to the agent device of the closest agent) of the available agents. As distance creates latency, therewith creating delays in communications, the nearest-agent tool 602 can be used to group the available agents by distance.

Given a contact center request, the nearest-agent tool 602 attempts to identify agents that result in an intra-datacenter engagement and, if that is not possible, in an intra-region engagement. To illustrate, and using the datacenters described above with respect to FIG. 5, for a customer located in the state of Ohio, an agent connected to the Denver datacenter may be preferred over an agent connected to the San Jose datacenter, and an agent connected to the San Jose datacenter may be preferred over an agent connected to the Melbourne datacenter.

The nearest-agent tool 602 can use geolocation data identified for, or associated with, an end user device to rank available agents based on the proximities of their respective agent devices to the end user device. Ranking the available agents can mean grouping the available agents into tiers based on their respective proximities to the location of the end user device. As alluded to above, the location of the customer datacenter to which the customer may be connected to can be used as a substitute for the location of the end user device. As such, and in an example, an available agent can be associated with a tier based on whether an intra-datacenter, an intra-region, or an inter-region engagement would result if the customer were to be connected to the available agent. More generally, a tiering of the available agents can be determined (e.g., identified) from closet to furthest locations.

The geolocation of a customer may be identified in any number of ways. In an example, an Internet Protocol (IP) address associated with the contact center request may be used, such as in the case where the customer initiates the request via a web browser or similar application. The nearest-agent tool 602 may include or use an IP address and geolocation lookup tool or service to obtain the geolocation from the IP address. In another example, the customer may use a telephone to initiate the contact center request. In such a case, the telephone number (e.g., a country code, an area code, or some other portion therein) from which the customer initiated the request can be used to identify the geolocation. The E.164 International Telecommunications Union for Telecommunications (ITU-T) standard (titled The international public telecommunication numbering plan) can be used to identify the constituents of the telephone number.

In another example, the geolocation (e.g., address) of the customer may be stored, such as in the data store 416 of FIG. 4, in a customer relationship management (CRM) system, or in some other data store. To illustrate, the customer may be an employee of a company who may be calling a help desk internal to the company to obtain IT support. The customer may be calling from an extension number to another extension number. As such, neither an IP address nor a full telephone number may be available to determine the location of the customer. In such a case, the nearest-agent tool 602 may use (e.g., interrogate or query) an internal system (e.g., a human resources system) to obtain the geolocation of the customer.

In an example, the geolocation of an agent can be determined as described with respect to the geolocation of a customer. In another example, the contact center may include a configuration indicating the datacenter that an agent is to be connected to regardless of the actual physical location of the agent. For example, a supervisor of an agent may configure the agent to be connected to a particular datacenter. As such, a location (and therefore an agent datacenter) of an agent may be administratively defined.

The agent-costing tool 604 can be used to determine respective costs (e.g., the monetary costs or tiering based on costs) associated with the handling of a contact center request by available agents. The respective costs can be used, such as by the agent selector tool 620, to connect the customer (i.e., the end user device of the customer) to one of available agents. In at least some situations, it may be desirable to route certain requests to a lowest cost agent regardless of the geographic location of the agent. Such may be the case for requests (or, more generally, queues) that do not require a high degree of expertise.

Different fully loaded costs may be associated with different agents. The agent-costing tool 604 can be configured to use one or more cost models to determine a lowest cost of handling a contact center request. In an example, the agent-costing tool 604 can use cost information for agents in a costing model. Any number of cost models may be implemented. To illustrate, and without limitations, cost data that may be used to determine a lowest cost agent can include base pay; benefits costs; employer and/or employee taxes; whether the agent is a contactor, an employee, or a third-party call service; variable costs, such costs of core hours, overtime hours, weekend hours, and holiday hours; country specific costs, including taxes and connectivity costs; and/or per engagement costs. In an example, different cost models may be associated with different agent groups (e.g., queues).

In an example, the agent-costing tool 604 may include facilities (e.g., features) that enable an authorized person to load (e.g., import), such as on a recurring basis, cost data into a data store, such as the data store 416 of FIG. 4. The agent-costing tool 604 may receive a configuration of one or more callback functions (or services) that the agent-costing tool 604 can use (e.g., call) to obtain a cost associated with the handling of a contact center request by an agent. A callback function (or service) may be or implemented by a routing helper, such as the routing helper 414 of FIG. 4.

To illustrate, and without limitations, the agent-costing tool 604 may be configured to use a callback function named getCostForCall( ) which may receive, as input, an agent (e.g., an agent identifier) and zero or more request details. In an example, the request details may include one or more of a modality associated with the request or a queue associated with the request. The getCostForCall( ) callback may be implemented (e.g., coded or written) in any suitable programming, scripting, or the like language, and that can invoked by the agent-costing tool 604. The getCostForCall( ) may use the loaded cost data. As another illustration, the callback function may be getCostsByQueue( ) which may receive, as input, a queue (e.g., a queue identifier or name) and zero or more request details. The getCostsByQueue( ) may return a respective cost associated with each of the agents associated with (e.g., assigned to) the queue. In an example, one or more respective callback functions may be associated with at least some of the queues of the contact center. In an example, the agent-costing tool 604 can be used to obtain a cost-based tiering of agents in addition or as an alternative to an actual cost. The tiering may be from highest to lowest cost or from lowest to highest cost.

The agent-costing tool 604 can be configured to call a callback function on a per request basis. That is, the agent-costing tool 604 can invoke the callback function whenever an incoming contact center request is to be routed to an agent. However, for at least some queues, that may not be necessary and the callback function associated with a queue may be invoked once per agent and the cost may not be specific to a contact center request. For example, when an agent starts their shift, the callback function associated with a queue to which the agent is assigned may be invoked to obtain a static per-request cost for the agent. In another example, when a condition is satisfied with respect to an agent, the callback function may be re-invoked for the agent. For example, when the agent crosses into overtime hours for a shift, the callback function may be re-invoked.

The agent-costing tool 604 can be used (via the callback function) to implement any desirable cost-based routing policy. Different queues may be associated with different cost-based routing policies. To illustrate, the agent-costing tool 604 may be used to implement a policy of routing requests based on the modalities of the request. For example, video-based requests may be routed to the costliest agents (i.e., agents associated with a highest tier or cost), voice-based requests may be routed to the next costliest agents, and chat-based requests may be routed to the least costly agents. As another example, a queue may be dedicated to supporting executives of large companies. A policy of routing requests to the most expensive available agents first may be associated with such a queue based on an assumption that higher cost associated with agent can be indicative of higher level of expertise of the agent. For example, a first queue may be associated with a policy of routing to the more expensive agents first and a second queue may be associated with a policy of routing to the least expensive agents first. As another example, one queue may be configured to receive requests over multiple modalities. Requests may be routed to agents associated with the queue based on cost and modality, as mentioned above.

The environment-scoring tool 606 may obtain, from agent devices of available agents, noise data. The noise data can be obtained from a local collector tool, such as the local collector tool 412 of FIG. 4. The environment-scoring tool 606 can use the noise data to configure (e.g., implement) routing policies (e.g., rules) that optimize the customer experience. In an example, if the noise level identified for an available agent exceeds a first threshold noise level and the noise frequency exceeds a first frequency level, the agent may be marked as unavailable for receiving contact center requests. In an example, if the noise level identified for an available agent exceeds a second threshold noise level (which, in an example, may be the same as the first threshold noise level), the agent may be excluded from being assigned incoming requests in certain modalities. For example, if the agent may be excluded from handling incoming requests for real-time (e.g., video) modalities. More generally, agents may be assigned to appropriate mediums of communications based on the characteristics.

In an example, if the noise frequency (or level) for an agent exceeds a threshold frequency level over a predefined period of time, a notification may be transmitted (such as to a supervisor) indicating the noise frequency. In an example, if the noise frequency for an agent exceeds a threshold frequency level over a predefined period of time, the environment-scoring tool 606 may associate the agent with a queue that does not require real-time communication. For example, the agent may be associated to a chat-only queue. In an example, even if an agent were relegated to a non-real-time modalities due to noise level or frequency, but no other agents are available and/or no agent is expected to become available within a threshold period of time to handle an incoming real-time request, the incoming request may be routed to an agent relegated to a non-real-time modality. In an example, agents may be grouped into tiers based on their respective noise data.

In an example, the environment-scoring tool 606 can be used to obtain reports regarding noise levels and noise frequencies for agents. Such reports may include the top X (where X is a positive integer) most noisy agents, the top Y (where Y is a positive integer) least noisy agents. Agents and authorized users may view, such as via user interfaces (e.g., graphical user interfaces) of the agent selection software 600, such reports and data (e.g., time series or trendlines) of noise levels and noise frequencies.

The network-scoring tool 608 may obtain, from agent devices of available agents, network-related data. The network related data can be obtained from an agent device, such as the agent device 404 of FIG. 4, using a local collector tool, such as the local collector tool 412 of FIG. 4. As described above, the network-related data received from an agent device can include at least some of packet-loss data, jitter data, latency data, or throughput data. In an example, in response to determining that an agent has completed an engagement, the network-scoring tool 608 may transmit a request for the network data (i.e., new network data) from the agent device of the agent.

The network-scoring tool 608 may group available agents into tiers or may update a previously determined tiering of agents based on received network data from an agent device. For example, an agent may be associated with a first tier based on a previously received network data and, in response to receiving new network data from the agent device, the agent may be associated with a second tier. To identify a tier for an agent, the network data received from the agent device of the agent may be converted into a connection metric according to a model that combines the network data to obtain the network metric. The disclosure is not limited by any particular model for translating network data into a network metric. The model can be a linear or a non-linear regression model, a neural network, a support vector machine (SVN) model, or some other model. In an example, the network metric can be obtained as a weighted sum of the network data. In an example, a network metric of 0 may indicate "no connection;" and a network metric of 100 may indicate "perfect connection."

Table I illustrates an example of the output of the model given different network data. The first row of Table I illustrates that if the network data received indicate a 0% packet loss, a jitter value of 0 milliseconds (ms), a throughput of 4 megabits-per-second (Mbps), and a latency of less than 30 ms, then the model outputs a network metric of 100; and the last row of Table I illustrates that if the network data received indicate a 25% packet loss, a jitter value of 300 milliseconds (ms), a throughput of 768 kilobits-per-second (kbps), and a latency of less than 350 ms, then the model outputs a network metric of 10. The network-scoring tool 608 can map an obtained network metric to a corresponding tier. In an example, ranges of network metrics may be mapped to agent tiers. To illustrate, network metric ranges [81-100], [50-80], [20-49], and [0-19] may be mapped, respectively to tier 1, tier 2, tier 3, and tier 4. However other mappings are possible.

TABLE I

| Packet Loss | Jitter | Throughput | Latency | Network Metric |
|---|---|---|---|---|
| 0% loss | 0 ms | 4 Mbps | <30 ms | 100 |
| 5% loss | 5 ms | 3 Mbps | 80 ms | 80 |
| 10% loss | 10 ms | 2 Mbps | 100 ms | 60 |
| 15% loss | 15 ms | 1 Mbps | 150 ms | 40 |
| 25% loss | 30 ms | 768 kps | 250 ms | 10 |

The network-scoring tool 608 can use the network data to configure (e.g., implement) policies that optimize the customer experience. In an example, if the network metric obtained for an agent is below a first network metric threshold, the agent may be marked as unavailable for receiving contact center requests that require a video-based modality. In an example, if the network metric obtained for an agent is below a second network metric threshold, the agent may be marked as available for receiving contact center requests that require a voice modality. More generally, agents may be assigned to appropriate mediums of communications based on the network metrics. Additionally or alternatively, agents may be grouped into tiers based on the network metrics.

The agent-specific metrics tool 610 uses data related to respective engagements of agents to calculate agent metric for the agents. In an example, in response to determining that an engagement is completed, the agent-specific metrics tool 610 may or another tool of the contact center software may present a survey to the customer to obtain customer feedback (i.e., end user survey data) regarding the agent and the agent interaction. Additionally, supervisory personnel may also provide supervisory feedback regarding engagements. An agent metric for an agent can be obtained based on an aggregation of customer feedback and supervisory feedback in a predetermined period of time (i.e., over the engagement handled by the agent in the predetermined period of time).

In an example, the agent-specific metrics tool 610 may include or use a sentiment analysis tool. The sentiment analysis tool can be used to identify and extract subjective information from text-based commentary provided by customers and/or supervisors regarding engagements. The text-based commentary may include opinions, attitudes, emotions, key-words, and feelings. The sentiment analysis tool can be used to associate respective objective measures with engagements. For example, with respect to an engagement, the sentiment analysis tool may indicate that the customer sentiment and/or the supervisory sentiment is a sentiment value corresponding to a positive sentiment, a negative sentiment, a neutral sentiment, or some other sentiments. The agent-specific metrics tool 610 can use the sentiment values in the calculations of the agent metrics. The value output by the sentiment analysis tool (based on an analysis of a set of engagements) is referred to herein as a workforce management (WFM) survey score. In an example, the WFM survey score can be further based on analyses of (recorded or real-time) verbal interactions of recordings of agents and customers during engagements that identify tones, keywords, talk-overs, and other markers indicative of customer satisfaction.

In an example, the agent-specific metrics tool 610 obtains an agent metric using formula (1). An agent metric value can be in the range of [1-100] or expressed as a percentage. In formula (1), $c_1$, $c_2$, and $c_3$ are weights that, in an example, may be configured to be $c_1=c_2=c_3=1$. The agent metric can be obtained based on a set of engagements. The set of engagements may be all engagements handled by an agent, a set of engagements handled by the agent within a predetermined period of time (such as the last 30 days or last week). In formula (1), "Agent Survey Score" can be a score that is obtained based on customer surveys (i.e., end user survey data), as described above; "Supervisor Survey Score" can be a score that is obtained based on surveys of supervisory personnel, as described above; and WFM Survey score can be a score that is obtained from a sentiment analysis tool.

$$\text{Agent Metric} = \frac{c_1(\text{Agent Survey Score}) + c_2(\text{Supervisor Survey Score}) + c_3(\text{WFM Survey Score})}{\sum_1^3 c_i} \quad (1)$$

The device-characteristics tool 612 may obtain, from agent devices of available agents, telemetry data. The telemetry data can be obtained from an agent device, such as the agent device 404 of FIG. 4, using a local collector tool, such as the local collector tool 412 of FIG. 4. The telemetry data can be as described above with respect to FIG. 4. In an example, in response to determining that an agent has completed an engagement, the device-characteristics tool 612 may transmit a request to the agent device of the agent (i.e., to the local collector tool thereat) for the telemetry data.

The local conditions tool 614 may obtain locale data related to a locale of an agent. The local conditions tool 614 may obtain the locale data based on a geolocation of an agent. The geolocation of an agent may be obtained as described above with respect to the nearest-agent tool 602. The local conditions tool 614 may obtain locale data from a routing helper, such as the routing helper 414 of FIG. 4. The routing helper may be a service that, given a geolocation (e.g., an address or a zip code), provides locale data related to the geolocation. The local conditions tool 614 may obtain locale data on a recurring basis, such as by querying the routing helper, or may receive notifications of from the routing helper.

In an example, the locale data may be or include emergency data (such as regarding an ongoing train derailment or an active shooter condition), weather condition data (such as data regarding ongoing or expected snow storms, tornado warnings or watches, or other weather advisories), or other locale data that the local conditions tool 614 can use to effect (e.g., modify) routing decisions of the agent selection software 600.

The local conditions tool 614 can use the locale data to configure (e.g., implement) policies (e.g., rules) that optimize the customer experience. For example, in response to identifying a slow moving emergency (e.g., a snowstorm that is anticipated within a threshold period of time (e.g., 2 hours)) at a locale of an agent, the agent selection software 600 may associate the agent with an agent tier that deprioritizes the routing of requests for contact agent interactions to the agent; and in response to identifying a fast moving or a current emergency (e.g., a tornado warning, a fire, a power outage) at a locale of an agent, the agent selection software 600 may stop routing requests to the agent.

The poor environment tool 616 can use environmental information for agents to route contact center requests appropriately. The poor environment tool 616 can determine (e.g., calculate) environment scores for agents. The poor environment tool 616 can use infrastructure related data, network related data, weather related data, device characteristics, and other environment information obtained by other tools of the agent selection software 600. For example, the poor environment tool 616 can use (e.g., combine) data obtained by the local conditions tool 614 (such as weather conditions), data obtained by the environment-scoring tool 606 (such as noise data), data obtained by the device-characteristics tool 612 (such as the telemetry data) to determine an extent to which environments of agents can be determined to be poor environments. The poor environment tool 616 can use the data collected from the other tools to rank or order agents based on their respective environmental information. In an example, the poor environment tool 616 can classify agent environments (i.e., environment scores) on an ordinal scale (such as 1 to 3; "good," "fair" and "poor;" or some other scale).

In an example, the poor environment tool 616 can calculate respective environment scores for agents. In an example, an environment score can be calculated as a weighted combination of a proximity of the agent to a customer associated with a contact center request, a current quality-of-service (QOS) metric associated with the infrastructure used by the agent, telemetry data (e.g., processor usage) associated with a device of the agent, and noise level at the physical environment of the agent.

In an example, the poor environment tool 616 causes a contact center request that is expected to be longer than a certain duration from being routed to an agent for whom an environment score is determined to be below a threshold. The expected duration of a contact center request, if the request were to be routed to an agent, can be estimated based on previous completed engagements by the agent.

The agent-routing efficiency tool 618 calculates measurable agent-routing efficiency scores for the data centers used in engagement (i.e., the agent datacenters and the customer datacenters used in engagements). The agent-routing efficiency scores can be used to optimize datacenter utilization for a service provider. The agent-routing efficiency scores can be used to reduce at least inter-region engagements therewith resulting in lower operating costs for the service provider. Said another way, the agent-routing efficiency tool 618 can be used to maintain engagements within a data center or within a region, which in turns may lower infrastructure costs for the contact center provider.

Figure 8:
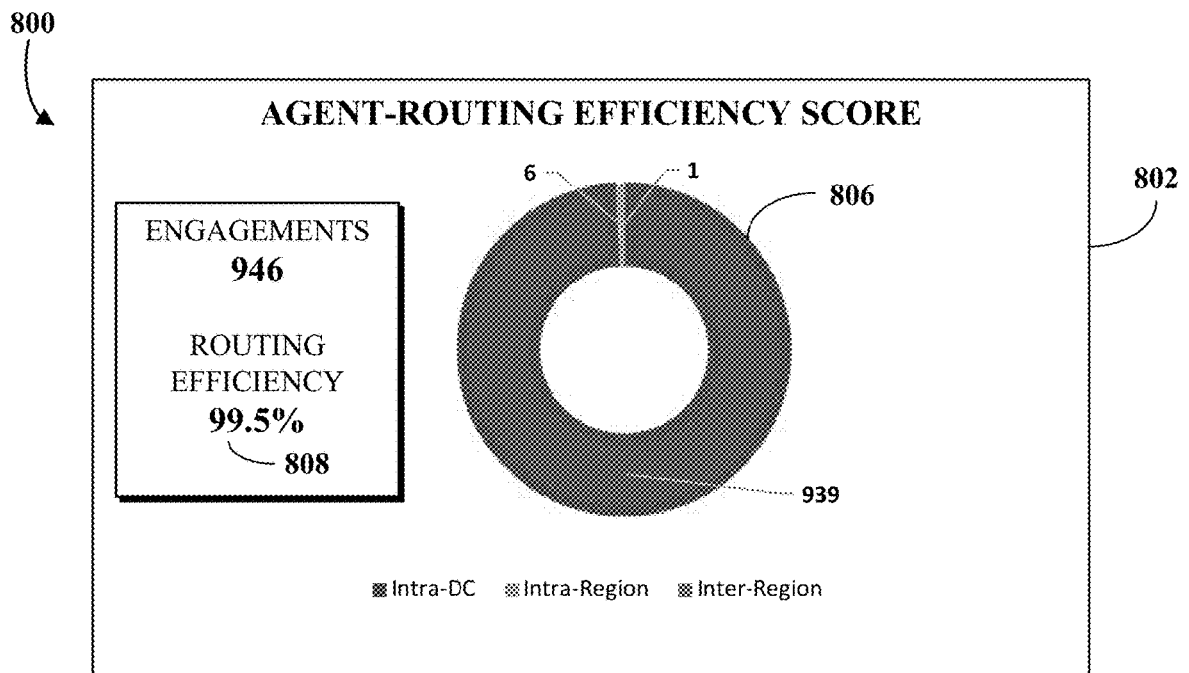
FIG. 8 illustrates an example of portions of a user interface of a dashboard illustrating agent-routing efficiency scores.
Figure 8:
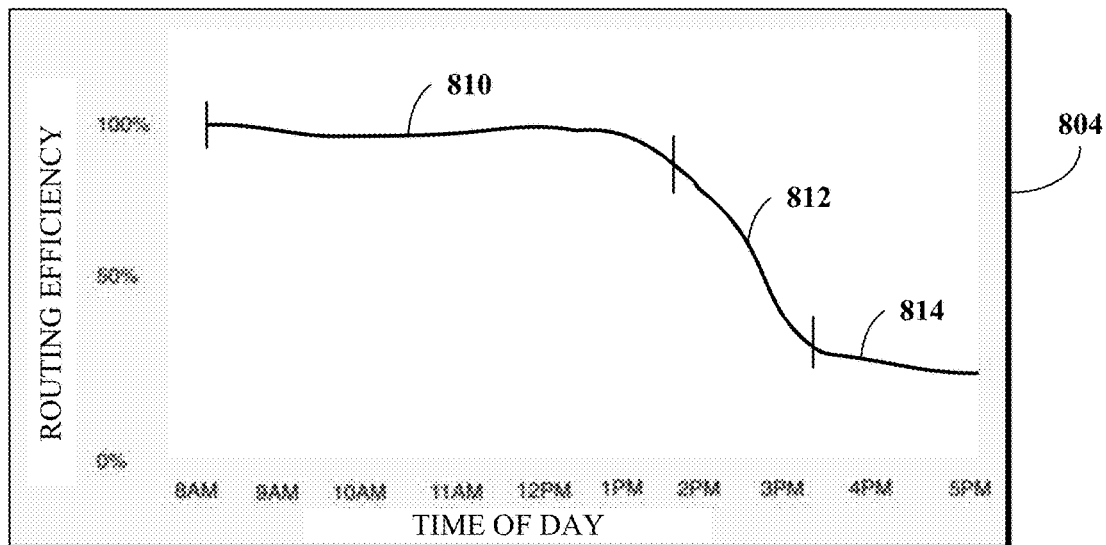

In an example, and as described with respect to FIG. 8, the agent-routing efficiency scores can be populated into (e.g., presented in) a user interface (e.g., a dashboard), which can provide drill down capabilities so that an authorized person (e.g., a supervisor or an administrator) can obtain further details regarding the agent-routing efficiency scores. By viewing the agent-routing efficiency scores over time, the authorized person may implement remediation actions to improve the agent-routing efficiency scores. The remediation actions may include re-locating agents (i.e., associating agents with different data centers), adding agents to a region; or associating agents with different communication modalities (such as non-real time communication modalities).

To calculate an agent-routing efficiency score for an engagement, the agent-routing efficiency tool 618 identifies the customer datacenter and the agent datacenter used for the engagement. The agent-routing efficiency tool 618 determines the agent-routing efficiency score based on the customer datacenter and the agent datacenter used for the engagement. In an example, the agent-routing efficiency tool 618 may use a weighting matrix (or a similar data structure) to obtain the agent-routing efficiency score for the engagement.

Agent-routing efficiency scores can be used to identify and remediate or mitigate reasons for latency, cross-talk, and increased silences during engagements. Agent-routing efficiency scores can also be used to measure the efficiency of regionalizing and localizing the customer experience by measuring the impact of moving agents or adding agents to different regions.

Figure 7:
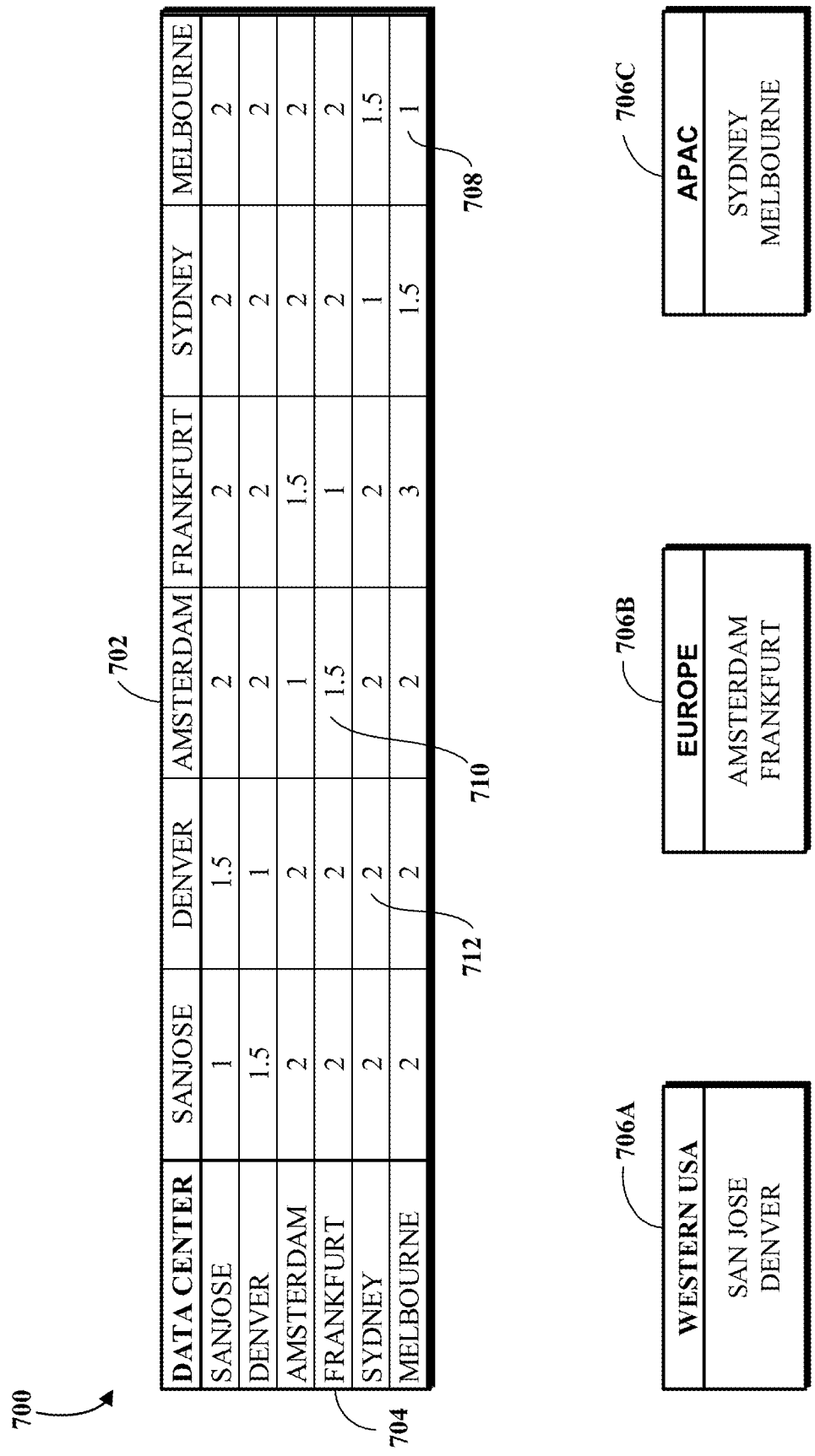
FIG. 7 illustrates an example of a weighting matrix used by an agent-routing efficiency tool of the agent selection software.

FIG. 7 illustrates an example of a weighting matrix 700 used by an agent-routing efficiency tool of the agent selection software, such as the agent-routing efficiency tool 618 of FIG. 6. The weighting matrix 700 may be stored, as an appropriate structure, in a datastore, such as the data store 416 of FIG. 4. The weighting matrix 700 includes a row and a column for at least some (e.g., each) of the datacenters (i.e., the datacenters 502 of FIG. 5) of a contact center, such as the contact center 400 of FIG. 4.

The weighting matrix 700 illustrates that the contact center includes datacenters physically located in the cities of San Jose, California, USA; Denver, Colorado, USA, Amsterdam, The Netherlands, Europe; Frankfurt, Germany, Europe; Sydney, Australia; and Melbourne, Austria. The datacenters are shown as being grouped into regions 706A, 706B, and 706C. The region 706A (labeled: "Western USA") includes the San Jose and Denver datacenters; the region 706B (labeled: "Europe") includes the Amsterdam and Frankfurt datacenters; and the region 706C (labeled: "APAC") includes the Sydney and the Melbourne datacenters. As can be appreciated, many more datacenters that may be located in other locations than those shown in FIG. 7 are possible. Similarly, the datacenters may be differently grouped into regions.

For each pair $(d_1, d_2)$ of datacenters, the weighting matrix 700 includes a weight indicatives of a communications cost or a routing efficiency of an engagement that uses $d_1$ as a customer datacenter and $d_2$ as an agent datacenter. An engagement (i.e., an intra-datacenter engagement) that uses the same datacenter for the agent and customer datacenters is assigned a lowest weight (e.g., 1), such as a weight 708. An engagement (i.e., an intra-region engagement) that uses same-region datacenters for the agent and customer datacenters is assigned a middle weight (e.g., 1.5), such as a weight 710. An engagement (i.e., an inter-region engagement) that uses datacenters from different regions for the agent and customer datacenters is assigned a heavy weight (e.g., 2), such as a weight 712. While the weighting matrix 700 shows weights between pair ($d_1$, $d_2$) of datacenters, the weights can be implemented between pairs of regions ($r_1$, $r_2$).

In an example, the weights for a datacenter can be dynamically updated to reflect conditions of the datacenter. To illustrate, if the Melbourne datacenter is determined to be experiencing connectivity or other operational issues, such as a heavy load, then the weights associated with the Melbourne server can be upwardly adjusted (i.e., incremented). When the issues are determined to be resolved, the weights associated with the Melbourne server can be reset to their base values.

Returning to FIG. 6 again, to calculate the agent-routing efficiency score for a time period, the agent-routing efficiency tool 618 divides the total quantity (i.e., number) of engagements within the time period into the aggregate (additive) weights of the datacenters, as shown in formula (2). The time period can be any time period (e.g., one hour or one day) and may be provided as input to the agent-routing efficiency tool 618. The routing efficiency score may be calculated such that a perfect score of 100% corresponds to intra-datacenter engagements. To determine an agent-routing efficiency score associated with an agent group (such as queue), the agent-routing efficiency tool 618 can calculate the agent-routing efficiency using the engagements handled by the agents of the agent group.

$$\text{Routing Efficiency Score (\%)} = \frac{\text{Number of Engagements in a Time Priod}}{\text{Aggregate Weight of Datacenters Used}} \quad (2)$$

To illustrate the functioning of formula (2), if 1000 engagements within a time period were all intra-datacenter engagements, then formula (2) results in a routing efficiency score of 100% (i.e., (1000 Engagements)/(1000×1)); if 1000 engagements within a time period were all intra-region engagements, then formula (2) results in routing efficiency score of 67% (i.e., (1000 Engagements)/(1000×1.5)); if 1000 engagements within a time period were all intra-region engagements, then formula (2) results in a routing efficiency score of 50% (i.e., (1000 Engagements)/(1000×2)); and if 500 engagements within a time period were intra-datacenter, 500 engagements were intra-region, and 500 were inter-region, then formula (2) results in a routing efficiency score of 67% (i.e., (1500 Engagements)/((500×1)+(500×1.5)+ (500×2))).

In some situations, an agent (who uses a first datacenter $DC_{A\_1}$) may transfer an engagement with a customer (who uses a datacenter $DC_C$) to another agent (who uses a second datacenter $DC_{A\_2}$) resulting in a "transferred engagement." When calculating the agent-routing efficiency score of the transferred engagement, the agent-routing efficiency tool 618 uses the average of the weights of the pairs of datacenters used. That is, the agent-routing efficiency tool 618 uses the average of the weights of ($DC_{A\_1}$, $DC_C$) and ($DC_{A\_2}$, $DC_C$) as the agent-routing efficiency score for the engagement.

In some situations, a first agent (who uses a first datacenter $DC_{A\_1}$) may add a second agent (who uses a second datacenter $DC_{A\_2}$) to an engagement with a customer (who uses a datacenter $DC_C$) resulting in an "additive engagement." When calculating the agent-routing efficiency score of the additive engagement, the agent-routing efficiency tool 618 adds the weights of the pairs of datacenters used. That is, the agent-routing efficiency tool 618 uses the sum of the weights of ($DC_{A\_1}$, $DC_C$) and ($DC_{A\_2}$, $DC_C$) as the agent-routing efficiency score for the engagement.

FIG. 8 illustrates an example of portions of a user interface 800 of a dashboard illustrating agent-routing efficiency scores. The user interface 800 includes summary data 802 and a detail data 804. The user interface 800 also includes a recommendation 816, which will be described further below.

The summary data 802 includes a donut chart 806 summarizing a breakdown of selected engagements that meet selection criteria (not shown). The donut chart 806 indicates that the selected engagements include 939 intra-datacenter engagements, six intra-region engagements, and one inter-region engagement. The agent-routing efficiency score calculated for these 946 (i.e., 939+6+1=946) engagements is 99.5% (as indicated by a score 808).

The detail data 804, which in this example may not necessarily correspond to the detail data 804, illustrates a line graph depicting time periods and associated agent-routing efficiency scores for some other selected engagements (not shown). The detail data 804 correspond to selected engagements where the customers are connected to customer datacenters in Europe.

A first portion 810 of the line graph illustrates that the engagements are handled by agents in Europe (i.e., agents who use datacenters in the Europe region). As such, these engagements are mostly intra-datacenter or intra-region engagements. A second portion 812 corresponds to a time window of 2:00 PM EST to 3:30 PM EST during which Europe-based agents complete their shifts and some of the contact center requests initiated by customers in Europe are routed to U.S.A.-based agents. As such, some these engagements are intra-region and some are inter-region resulting in agent-routing efficiency scores that are lower than those of the first portion 810. A third portion 814 illustrates that almost all of the engagements handled after 3:00 PM EST were handled by U.S.A.-based agents. As such, the agent-routing efficiency scores after 3:00 PM EST are even lower than those of the second portion 812.

A manager may be responsible for agents who are globally distributed. The manager may be able to use the dashboard to drill down into the agent-routing efficiency scores to identify reasons for sub-optimal scores. For example, the dashboard may present to the manager the specific list of engagements (including the used agent datacenters and customer datacenters) that are intra-region and/or inter-region engagements.

To improve the agent-routing efficiency score for engagements, the agent-routing efficiency tool 618 may configure agents to connect to datacenters other than those that the agents are currently configured to connect to and/or may cause customers to connect to different datacenters.

To configure agents to connect to different datacenters, the agent-routing efficiency tool 618 can identify (e.g., select) the engagements ("sub-optimal engagements") causing the lower than desired agent-routing efficiency scores and can identify the customer datacenters and the agent datacenters used by those sub-optimal engagements. The agent-routing efficiency tool 618 can perform what-if analyses (i.e., simulations) of configuring agents to connect to different datacenters. A what-if analysis can be an iterative process of simulating configuring agents to use datacenters that would result in intra-datacenter or intra-region engagements for the sub-optimal engagements. The what-if analyses calculate respective simulated agent-routing efficiency scores for the sub-optimal engagements and other engagements occurring within a given time period.

In an example, the agent-routing efficiency tool 618 can configure agents based on the results of the what-if analysis resulting in the best (i.e., highest) agent-routing efficiency score. In another example, the agent-routing efficiency tool 618 may cause a recommendation of the configuration to be presented in a user interface of the agent selection software 600. In response to receiving a command via the user interface, such as from an authorized person, the agent-routing efficiency tool 618 can then accordingly configure the agents. To illustrate, the recommendation 816 illustrates an example of a recommendation that may presented to au authorized user on the user interface 800 of FIG. 8. The recommendation 816 recommends configuring 5 additional agents to use the Amsterdam datacenter between the hours of 3:00 PM and 5:00 PM. The authorized person may cause the agent-routing efficiency tool 618 to perform the configuration of the agents by invoking a command button 818.

To cause customers to connect to different datacenters, respective access mechanisms associated with respective customer datacenters may be changed to be associated with different customer datacenters. To illustrate, customers may use a telephone number to initiate contact with the contact center. The telephone number may be configured to cause a caller (i.e., a customer) using the telephone number to connect to a first customer datacenter. To cause customers to use a second customer datacenter, the telephone number may be reconfigured to be associated with the second customer datacenter. Similar to the configuring agents to connect to different datacenters, the agent-routing efficiency tool 618 may perform what-if analyses with respect to associating access mechanisms of sub-optimal engagements with different customer datacenters. The agent-routing efficiency tool 618 may configure, or may receive a command to reconfigure, access mechanisms based on the results of the what-if analyses.

The agent selector tool 620 obtains a configuration of a routing policy, such as from an authorized user. The routing policy can be used to route requests for a contact center interactions to agents. That is, in response to receiving a contact center request, the agent selector tool 620 uses the routing policy to identify an agent to route the request to. A routing policy may be associated with an agent group (e.g., a queue). A routing policy to associate with an agent group may be obtained using a user interface that can be as described with respect to FIG. 9.

Figure 9:
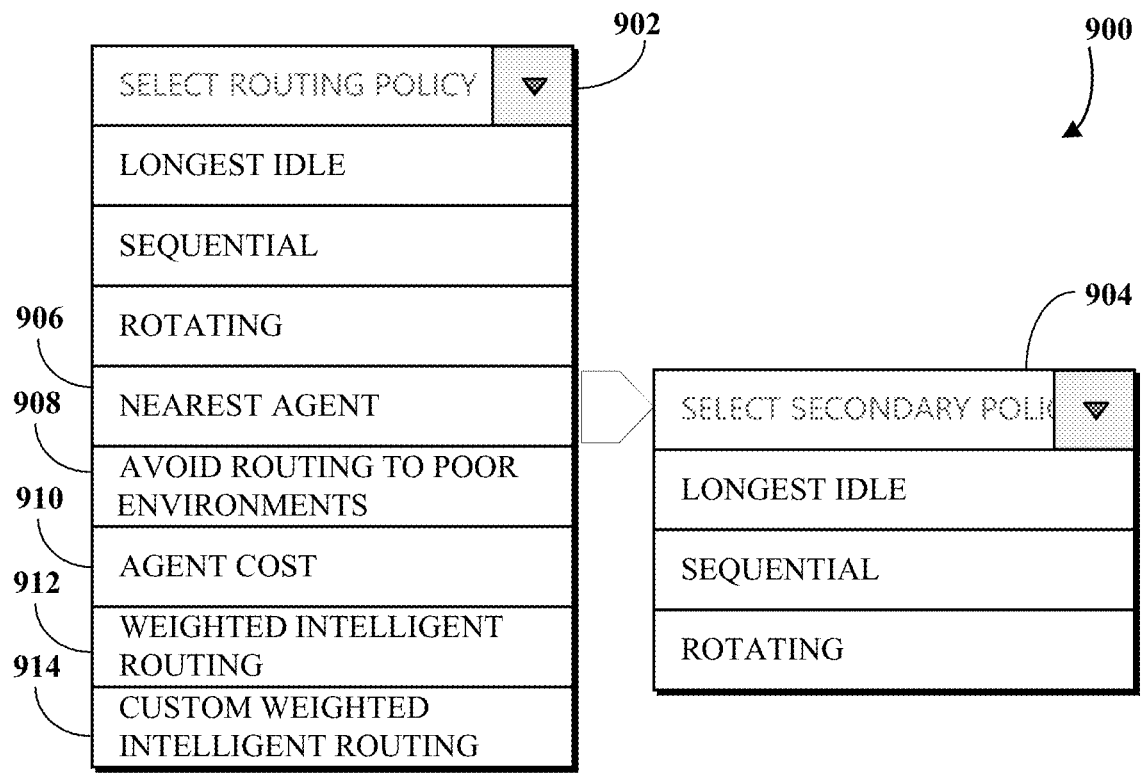
FIG. 9 illustrates an example of a portion of a user interface for obtaining a selection of a routing policy.

FIG. 9 illustrates an example of a portion of a user interface 900 for obtaining a selection of a routing policy. The user interface 900 includes a policy selector 902. In some implementations, multiple cascading policies may be associated with an agent group. The user interface 900 illustrates a primary policy that may be selected using the policy selector 902 and a secondary policy that can be selected using a secondary policy selector 904. While two levels of cascading policies are illustrated in FIG. 9, more levels are possible. Each level of a cascading policy results in the identification of a sub-set of agents identified at the immediate previous level. Additionally, while the secondary policy selector 904 is shown as only including three routing policies, the secondary policy selector 904 can include more routing policies.

The policy selector 902 includes policy options 906-914. The policy option 906 (i.e., "NEAREST AGENT") results in agents being selected as described with respect to the nearest-agent tool 602 of FIG. 6. The policy option 908 (i.e., "AVOID ROUTING TO POOR ENVIRONMENT") results in agents being selected as described with respect to the poor environment tool 616 of FIG. 6. The policy option 910 (i.e., "AGENT COST") results in agents being selected as described with respect to the agent-costing tool 604 of FIG. 6.

The policy option 912 (i.e., "WEIGHTED INTELLIGENT ROUTING") results in agents being selected based on respective weightings (e.g., tiers) of agents as obtained using at least some of the tools described with respect to FIG. 6. The policy corresponding to the policy option 912 is referred to as a weighting-based routing policy. When the weighting-based routing policy is used, factors (i.e., scores associated therewith) can be used to obtain routing scores for agents. The routing scores can be used to select at least one agent for routing a contact center request.

Referring again to FIG. 6, the routing scores for agents can be calculated on a configurable, recurring basis, such as daily, hourly, at the time that an agent connects to the contact center web platform 510 (as described with respect to FIG. 5), on demand, or at the completion of an engagement. To illustrate, and as illustrated with respect to FIG. 10, an agent may cause their routing score to be recalculated, such as in response to determining that network conditions have improved for them. Similarly, an authorized person may cause the routing scores of one or more agents to be recalculated. The higher the score of an agent the more likely that a contact center request will be routed to the agent.

A contact center request is routed to the agent with highest routing score, if available (e.g., not currently participating in an engagement); otherwise the request is routed to the agent having the next highest routing score and who is available. Selection of agents may further apply filtering based on skills identified for the contact center request. To illustrate, if the agent with the highest routing score does not speak Spanish, which is identified as a required skill for a contact center request, then the request is not routed to the agent.

The factors can include a network connection score, zero or more environmental factors, zero or more agent metrics, and/or agent cost factors. The environmental factors can include proximity of an agent to the customer from whom the contact center request is received, noise related data, telemetry data, and/or weather-related data. The agent metrics can include agent survey results (i.e., customer feedback and/or supervisory feedback) and sentiment analysis data.

In an example, a routing score for an agent can be calculated using formula (3), where $w_1$, $w_2$, and $w_3$ are weights that, in an example, may be configured to be $w_1=2$, $w_2=1$, and $w_3=1$. In another example, the weights can be $w_1=0$, $w_2=1$, and $w_3=1$. The routing score can be a value in the range of [1-100] or may be expressed as a percentage. In formula (3), "Agent Metric" can be the "agent metric" obtained by the agent-specific metrics tool 610; the "Network Connection Score" can be the "network metric" obtained by the network-scoring tool 608; and "Env Factor" can be the "environment factor," which can be obtained as a weighted combination of one or more of a proximity of the agent to a customer associated with a contact center request, a current quality-of-service (QOS) metric associated with the infrastructure used by the agent, telemetry data (e.g., processor usage) associated with a device of the agent, and noise level at the physical environment of the agent. The weights used can be pre-configured or can be obtained, such as from an authorized person, as further described herein.

$$\text{Routing Score} = \frac{w_1(\text{Agent Metric}) + w_2(\text{Network Connection Score}) + w_3(\text{Env Factor})}{\sum_{i=1}^{3} \sum w_i} \quad (3)$$

Figure 10:
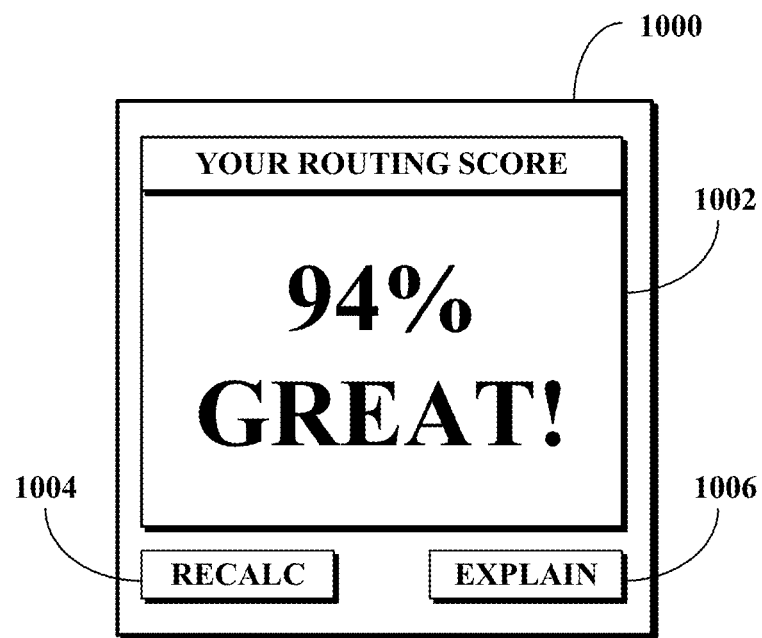
FIG. 10 illustrates an example of a tile depicting an agent routing score.

FIG. 10 illustrates an example of a tile 1000 depicting an agent routing score. The tile 1000 may be displayed in a user interface, such as a home page of an agent, presented by a contact center software, such as contact center 400 of FIG. 4. The tile 1000 includes a score 1002 showing the agent score of the agent. The agent can cause the agent selector tool 620 of FIG. 6 to recalculate their agent routing score by invoking (e.g., pressing) a command 1004. By invoking a command 1006, the agent can cause the agent selector tool 620 to provide (e.g., display) calculation values (as described above) or engagements analyzed in order to arrive at the agent routing score displayed in the score 1002.

Referring again to FIG. 6, the ML weighting tool 622 uses engagement statistics (i.e., data related to engagements) to obtain weights for combining different metrics (e.g., scores) described herein for obtaining routing scores for agents. In the foregoing, pre-configured (e.g., fixed) weights were described with respect to formulae (1) and (3). Instead of pre-configured weights, the ML weighting tool 622 can be or include an ML model can be trained to output weights that can be used to calculate routing scores for agents. In an example, the ML model can be trained to output the routing score for agents.

At least some historical engagements can be used as training data for the ML model. With respect to each of the historical engagements, variables (e.g., data) regarding (e.g., aligned with or relating to) consumers, supervisors, datacenters, and agents can be used to train the ML model. To illustrate and as described above, the customer and supervisor data may include sentiment satisfaction reports and survey reports. Respective metrics including agent-specific metrics, environmental metrics, agent-cost metrics, and engagement-specific metrics can be determined for the training engagements and used as training data.

In an example, end user survey data can be used as the ground truth for training the ML model. That is, the ML model can be trained to optimize the customer experience. Said another way, the ML model can identify the optimal weights of other factors (e.g., metrics) therewith resulting in expected optimal (e.g., highest) customer satisfactions (e.g., highest user survey results for engagements). Said yet another way, a weighted routing decision (e.g., a weighted identification of one or more agents to route a call to) that is based on the weights output by the ML model can be expected to result in a high level of satisfaction by a customer who initiates a contact center request. The ML model can be a supervised ML model that enables the agent selection software 600 to correlate desired customer satisfaction scores with environment metrics. With inputs collected, the agent selection software 600 can be said to score engagements and compare the scored engagements with other engagements. It is noted that, in an example, since the ML model is trained using the end user survey results as the ground truth, the ML model may not output a weight corresponding to the user survey result metric.

In an example, the ML model may be trained to output engagement-independent weights. That is, the weights are not obtained every time routing scores for agents are to be calculated. Said another way, the same weights obtained from the ML model are used every time routing scores for agents are to be calculated. The weights may change if/when the ML model is retrained.

In another example, the ML model may be trained to output engagement-specific weights. That is, whenever routing scores for agents are to be calculated, the ML model is used to obtain weights for calculating the scores using the formulae described herein. When a contact center request is received, request-specific metrics are identified, and for each agent of available agents, respective metrics that are the same as those used for training the ML model are obtained (e.g., selected, calculated, or extracted), such as respective agent-specific metrics, respective environmental metrics, respective agent-cost metrics, and used as inputs to the ML model.

The weighting tool 624 can be used to obtain, such as from an authorized person, weights for calculating agent routing scores. As described above, such as with respect to formulae (1) and (2), pre-configured weights are used. The weighting tool 624 can be used to obtain different weights and to enable an administrator to identify which factors are to be used in obtaining agent routing scores. The weights can be obtained with respect to a queue (or an agent group). The weights obtained by the weighting tool 624 can be used to obtain (e.g., calculate) routing scores for agents, as described herein. The weighting tool 624 can present (e.g., display or cause to be displayed) a user interface, such as one of the user interfaces described with respect to FIG. 11A or FIG. 11B, which the authorized user can use to provide the weights.

Figure 11A:
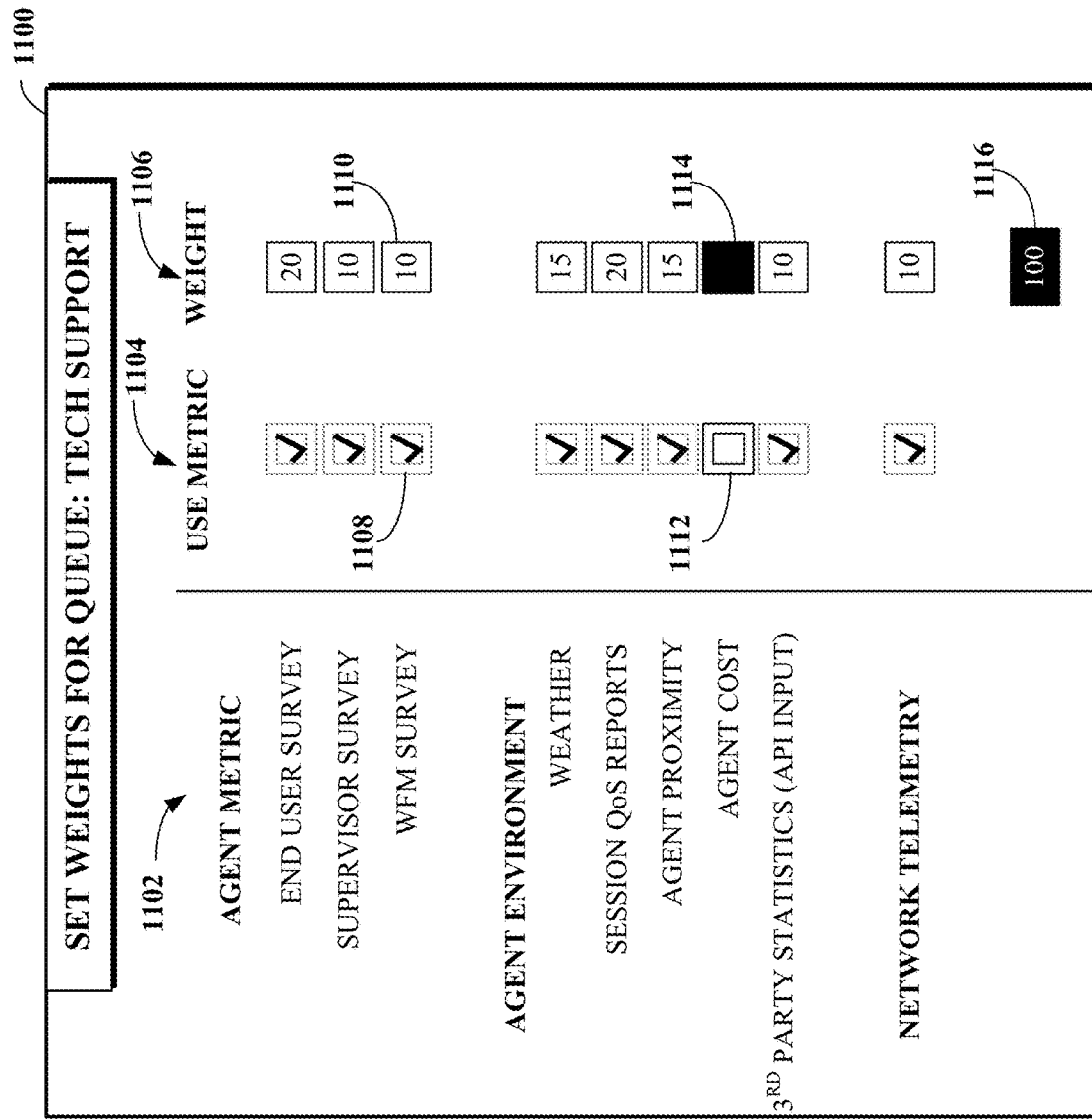
FIGS. 11A-B are examples of user interfaces for providing weights used for calculating routing scores for agents.

FIG. 11A is an example of a user interface 1100 for providing weights used for calculating routing scores for agents. A column 1102 includes metrics that an agent selection software, such as the agent selection software 600 of FIG. 6, uses in calculating routing scores for agents. Each of the metrics of the column 1102 includes a corresponding checkbox in a column 1104 and a corresponding weight field in a column 1106. An authorized user selects the metrics that are to be used in calculating the routing scores for agents by checking the desired checkboxes in the column 1104. If a checkbox is checked, then the corresponding weight field in the column 1106 becomes available (e.g., is enabled) so that the authorized user can enter a desired weight.

To illustrate, as the authorized user has checked a checkbox 1108 indicating that the WFM Survey score is to be used, a corresponding weight field 1110 is available for the authorized user to enter a weight (e.g., the authorized entered 10%), which may be used as, or is converted to a constant that can be used as, the weight $c_3$ of formula (1); and as the authorized user has not checked a checkbox 1112, a corresponding weight field 1114 is not available for the authorized user to provide a value for the agent cost metric. A field 1116 shows the total of all the values of the weight fields of the column 1106. The value of the field 1116 must equal to 100 for the authorized user selections to be accepted. It is to be noted that the disclosure is not limited by the particular arrangement of fields and controls of data shown in FIG. 11A and that other arrangements and data are possible.

Figure 11B:
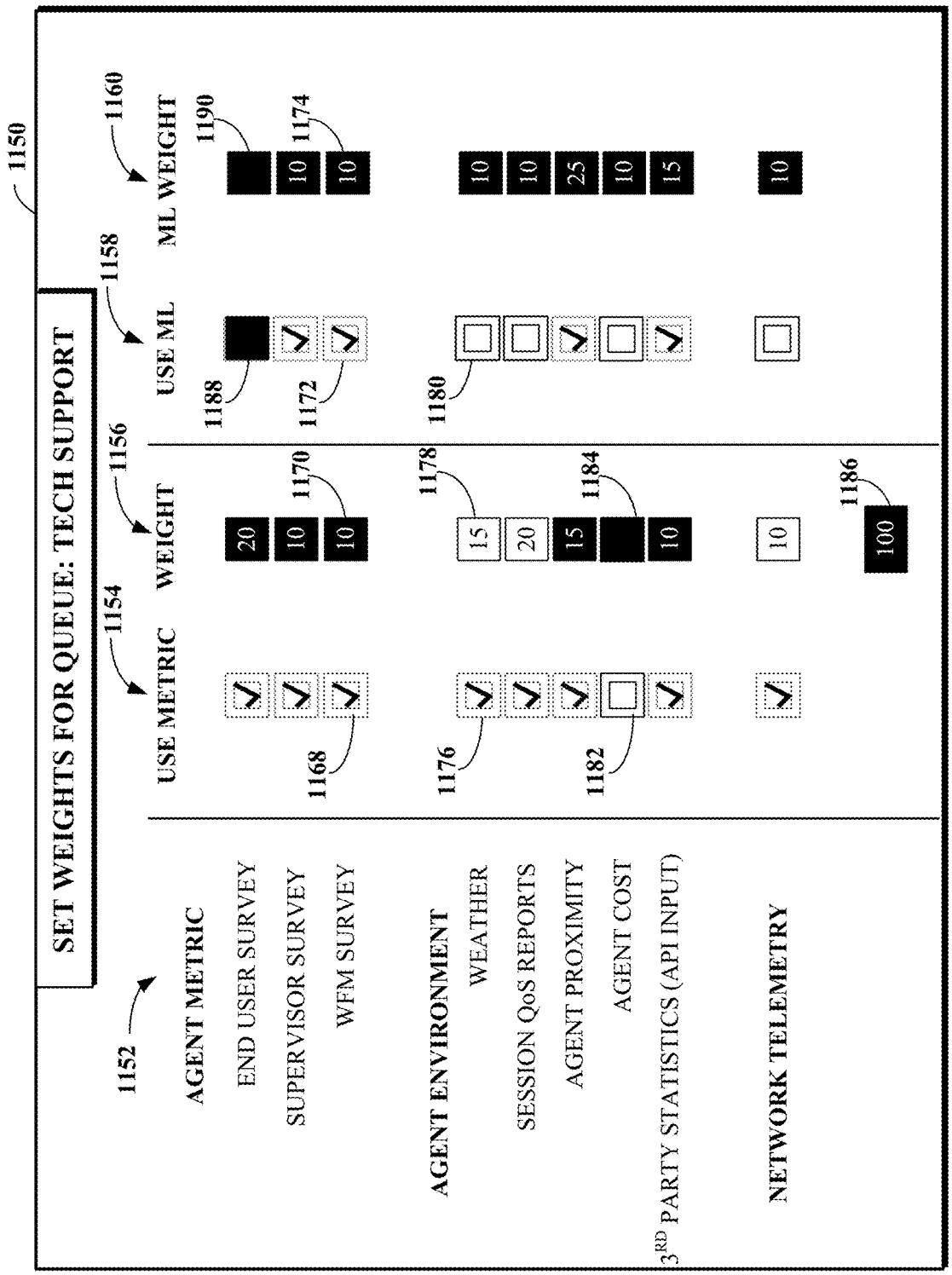

FIG. 11B is an example of a user interface 1150 for providing weights used for calculating routing scores for agents. A column 1152 includes metrics that an agent selection software, such as the agent selection software 600 of FIG. 6, uses in calculating routing scores for agents. Each of the metrics of the column 1152 includes a corresponding checkbox in a column 1154, a corresponding weight field in a column 1156, a corresponding ML checkbox in a column

1158, and a corresponding ML weight field in a column 1160. The user interface 1150 is distinguished form the user interface 1100 of FIG. 11A in that the user interface 1150 shows weights determined by the ML weighting tool 622 of FIG. 6.

An authorized user selects the metrics that are to be used in calculating the routing scores for agents by checking the desired checkboxes in the column 1154. If a checkbox in the column 1154 is checked, then the authorized user can either select to use the corresponding ML weight by selecting the correspond ML checkbox in the column 1158 or can enter a weight in the corresponding weight field is the column 1156.

To illustrate, as the authorized user has checked a checkbox 1168 (indicating that the WFM Survey score is to be used) and has checked an ML checkbox 1172 (indicating that the corresponding weight determined by the ML weighting tool 622 is to be used), a weight field 1170 is not enabled for the authorized user to provide a weight; rather, the weight field 1170 is populated from an ML weight field 1174; as the authorized user has checked a checkbox 1176 (indicating that a weather metric to be used) and has not checked an ML checkbox 1180, a weight field 1178 is available for the authorized user to provide a weight (e.g., 15%); and as the authorized user has not checked a checkbox 1182, a corresponding weight field 1184 is not available for the authorized user to provide a value for the agent cost metric. A field 1186 shows the total of all the values of the weight fields of the column 1156. The value of the field 1186 must equal to 100 for the authorized user selections to be accepted. It is to be noted that the disclosure is not limited by the particular arrangement of fields and controls of data shown in FIG. 11A and that other arrangements are data are possible. As described above, the ML weighting tool 622 of FIG. 6 does not output a weight for the end user survey metric. As such, an ML checkbox 1188 and an ML weight field 1190 are not available.

To further describe some implementations in greater detail, reference is next made to examples of techniques which may be performed for, inter alia, identifying an optimal agent or a group of agents to route a contact center request to. FIGS. 12-17 are flowcharts of examples of techniques 1200-1700, respectively, that can be used in routing, or in optimization the routing of, contact center requests to agents. The techniques 1200-1700 can be executed using computing devices, such as the systems, hardware, and software described with respect to FIGS. 1-11B. The techniques 1200-1700 can be performed, for example, by executing respective machine-readable programs or other computer-executable instructions, such as routines, instructions, programs, or other code. The steps, or operations, of each of the techniques 1200-1700 or another technique, method, process, or algorithm described in connection with the implementations disclosed herein can be implemented directly in hardware, firmware, software executed by hardware, circuitry, or a combination thereof.

Figure 12:
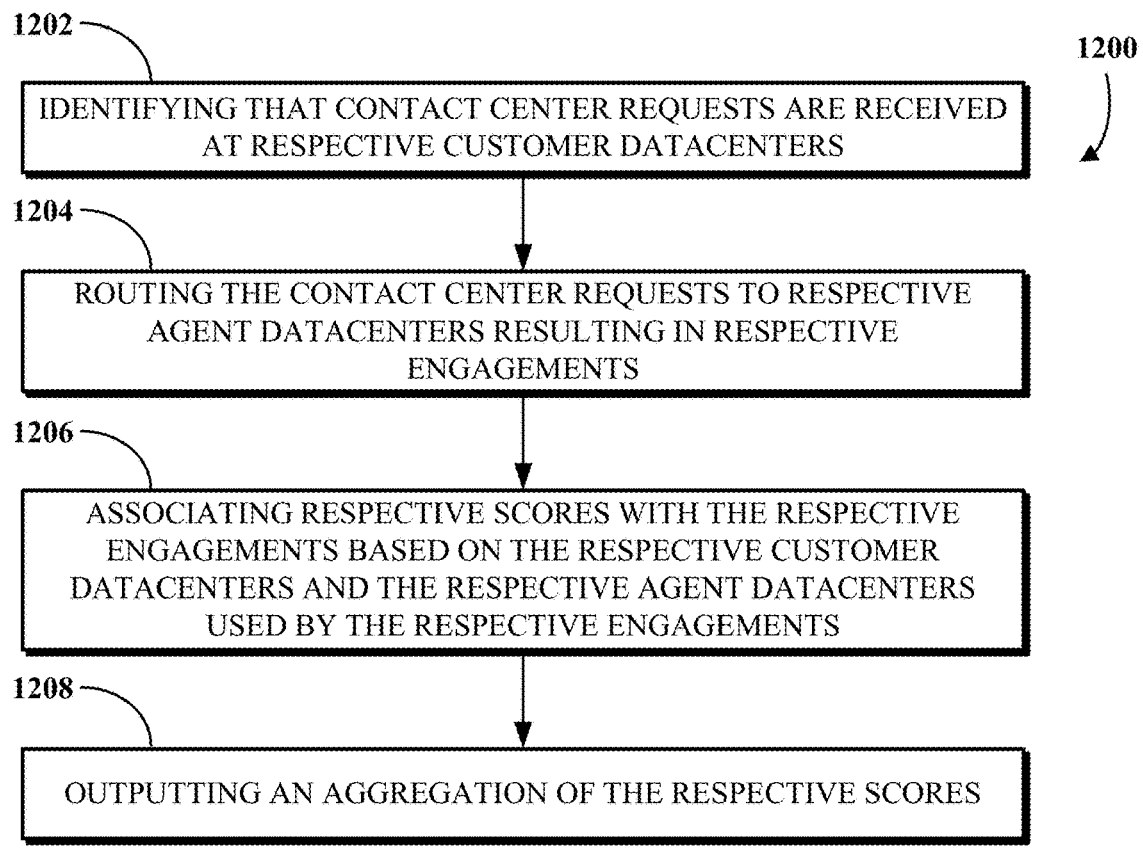
FIG. 12 is a flowchart of an example of a technique for determining agent-routing efficiency scores.

FIG. 12 is a flowchart of an examples of the technique 1200 for determining agent-routing efficiency scores. The agent-routing efficiency scores can be used in optimizing utilization of datacenters used, such as to route contact center requests to agents. The agent-routing efficiency scores can be calculated and used as described with respect to the agent-routing efficiency tool 618 of FIG. 6.

At 1202, the technique 1200 identifies that contact center requests are received at respective customer datacenters. A contact center system, such as the contact center 400, can identify that the contact center requests are received at respective customer datacenters. The contact center requests can be received as described above, such as with respect to FIG. 5. At 1204, the contact center requests are routed to respective agent datacenters resulting in respective engagements. As described above, each engagement can use a respective customer datacenter and a respective agent datacenter.

At 1206, respective scores (i.e., respective agent-routing efficiency scores) are associated with the respective engagements. The scores can be calculated based on the respective customer datacenters and the respective agent datacenters used by the respective engagements, such as described above. In an example, the respective scores can be associated with the respective engagements by obtaining the respective scores using a weighting table, that includes weights such that each weight corresponds to a combination of a customer datacenter and an agent datacenter. In an example, the weighting table can be as described with respect to FIG. 7.

In an example, if an engagement is transferred from a first agent datacenter to a second agent datacenter, an average weight of a first weight associated with the first agent datacenter and a second weight associated with the second agent datacenter can be used in associating a score to the engagement. In an example, if more than one agent datacenters are simultaneously used in an engagement, a sum of weights of the more than one agent datacenters can be used in associating a score to the engagement.

At 1208, an aggregation of the respective scores can be output, such as to an agent or an authorized person. In an example, the output can be as described with respect to FIG. 8.

In an example, at least one available agent can be configured to connect to a first agent datacenter. After obtaining the respective scores, the at least one available agent can be reconfigured to connect to a second agent datacenter that is different from the first agent datacenter. The at least one available agent is reconfigured to connect to the second agent so that the respective scores of future engagements, as a whole, are improved over previous similar engagements. In an example, determining which agent(s) to reconfigure to connect to which different centers can be based on results of what-if analyses, as described above.

In an example, and as described above, engagements may be classified into intra-datacenter, intra-region, or inter-region engagements. An engagement that uses the same datacenter for a customer datacenter and an agent datacenter is classified as an intra-datacenter engagement. An engagement that uses a customer datacenter and an agent datacenter that are configured to be in a same region is classified as an intra-region engagement. An engagement that uses a customer datacenter and an agent datacenter that are configured to be in different regions is classified as an inter-region engagement.

Figure 13:
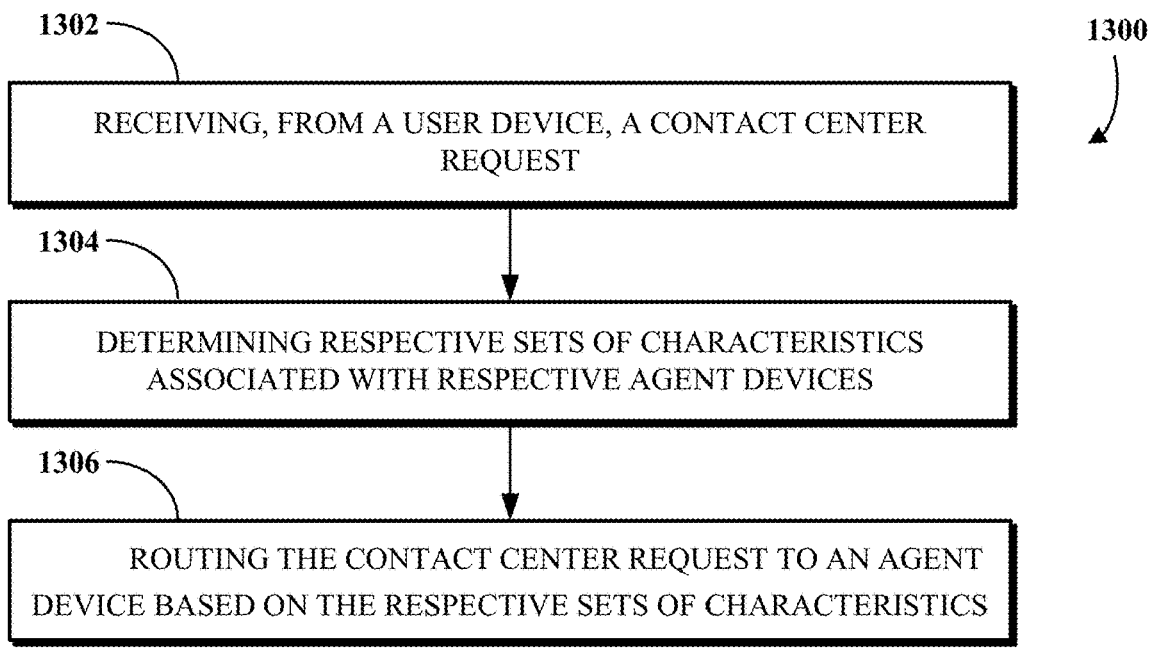
FIG. 13 is a flowchart of an example of a technique for routing contact center requests based on characteristics associated with devices of agents.

FIG. 13 is a flowchart of an examples of the technique 1300 for routing contact center requests based on characteristics associated with devices of agents. At 1302, a contact center request is received from a user device. The user device can be the user device 402 of FIG. 4 and the contact center request can be received by the contact center 400 of FIG. 4, or the user device can be the end user device 504 of FIG. 5 and the contact center request can be received via the customer website 508 or the customer datacenter 512 of FIG. 5.

At 1304, respective sets of characteristics associated with respective agent devices are determined. In an example, the respective sets of characteristics can be determined as described with respect to at least one of the device-characteristics tool 612, the local conditions tool 614, or the poor environment tool 616 of FIG. 6.

In an example, a characteristic of a set of the characteristics associated with an agent device may be obtained based on telemetry data received from the agent device. In an example, a characteristic of a set of the characteristics associated with the agent device may be obtained based on a location of the agent device. For example, the characteristic may relate to weather, emergency, or other locale data at the location of the agent device and which may be obtained by a local conditions tool, such as the local conditions tool 614 of FIG. 6. As also described above, the respective sets of characteristics associated with the respective agent devices can be or include respective noise levels determined using data obtained from respective sensors of the respective agent devices. In an example, respective environment scores for the respective agent devices can be obtained based on the respective sets of characteristics and the respective agent devices can be ranked based on the respective environment scores.

At 1306, the contact center request is routed to an agent device of the respective agent devices based on the respective sets of characteristics. Routing the contact center request to the agent device can mean connecting the agent device to the user device therewith establishing an engagement.

In an example, the technique 1300 can include identifying, based on at least one characteristic of a set of characteristics associated with the agent device, allowable communication modalities. That is, based on the characteristics associated with an agent device, the agent may not be routed contact center requests associated with (or which require) communicating with the customer via certain modalities. However, it may be acceptable for the agent to handle contact center requests that require other (i.e., allowable) communication modality. To illustrate, even if the physical environment of an agent is noisy, the agent may still be able handle engagements using a chat modality without degrading the customer experience. That is, in response to determining that the set of characteristics associated with the agent device indicates a high noise level detected using sensor data from the agent device, the agent device (or, equivalently, the agent) can be associated with a chat modality. More generally, the contact center request can be routed to the agent device responsive to a determination that the contact center request is associated with one of the allowable communication modalities.

In an example, if the set of characteristics associated with the agent device indicates a processor usage of the agent device that is greater than a threshold usage, then the agent device (or, equivalently, the agent) can be associated only with a chat modality and/or with a chat request queue (i.e., a queue that only receives contact center requests via a chat modality). In an example, if the set of characteristics associated with the agent device indicates a network bandwidth that is lower than a bandwidth threshold of the agent device, the agent device (or, equivalently, the agent) can be associated with a non-real time (e.g., non-video) modality and/or with a non-real time request queue.

Figure 14:
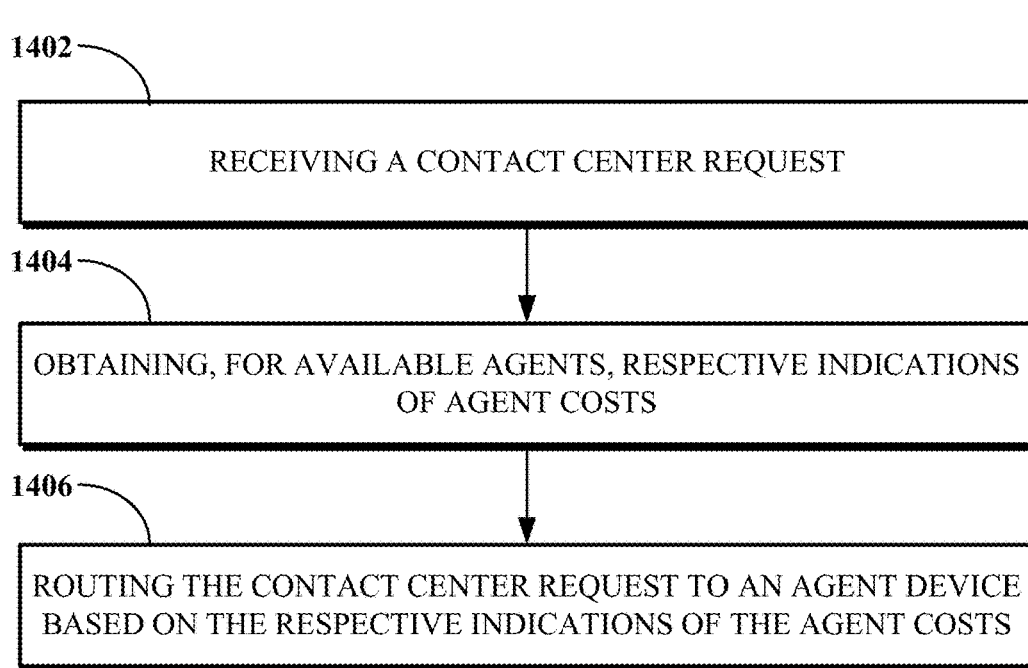
FIG. 14 is a flowchart of an example of a technique for routing contact center requests based on cost data associated with agents.

FIG. 14 is a flowchart of an examples of the technique 1400 for routing contact center requests based on cost data associated with agents. Routing contact center requests based on cost data associated with agents can be as described with respect to the agent-costing tool 604 of FIG. 4.

At 1402, a contact center request is received. The contact center request can be received from a user device. The user device can be the user device 402 of FIG. 4 and the contact center request can be received by the contact center 400 of FIG. 4, or the user device can be the end user device 504 of FIG. 5 and the contact center request can be received via the customer website 508 or the customer datacenter 512 of FIG. 5.

At 1404, respective indications of agent costs are obtained for available agents. In an example, the respective indications of the agent costs for the available agents can be or include respective tiers of the available agents. In an example, the respective indications of the agent costs for the available agents can be or include respective actual monetary costs of the available agents for handling the contact center request. In an example, the respective indications of the agent costs can be obtained by calling a configured callback function that receives at least an indication of an agent of the available agents and outputs the respective indication of the agent cost for the agent, as described above with respect to the agent-costing tool 604 of FIG. 6.

In an example, the respective indications of the agent costs for the available agents are obtained with respect to the contact center request. Said another way, the respective indications of the agent costs for the available agents are obtained in response to receiving the contact center request. That is, specific aspects of the contact center request are taken into consideration (i.e., passed to the callback function) in the obtaining (e.g., calculating) of the indications of the agent costs. To illustrate, and without limitation, a cost of an agent handling a contact center request received at one queue (e.g., a first-level support queue) may be different from a cost of the agent handling a contact center request received at a different queue (e.g., a second-level support queue or a queue dedicated to supporting executives of large corporations).

In another example, such as with respect to a particular queue, a respective indication of an agent cost for an available agent can be obtained prior to receiving the contact center request. That is, obtaining (e.g., calculating) the respective indication of the agent cost need not take into account aspects of the contact center request. In an example, the technique 1400 may assign agents to contact center queues based on the respective indications of the agent costs.

In an example, a first subset of the available agents can be assigned to a first queue of a contact center and a second subset of the available agents can be assigned to a second queue of the contact center based on the respective indications of the agent costs. The first queue may be associated with a real-time communication modality and the second queue may be associated with a non-real-time communication modality. In an example, the respective indications of the agent costs for the available agents may include, for at least one agent, an indication that no additional cost is incurred in a case that the request for the contact center request is routed to the at least one agent.

At 1406, the contact center request can be routed to an agent device of an agent of the available agents based on the respective indications of the agent costs.

Figure 15:
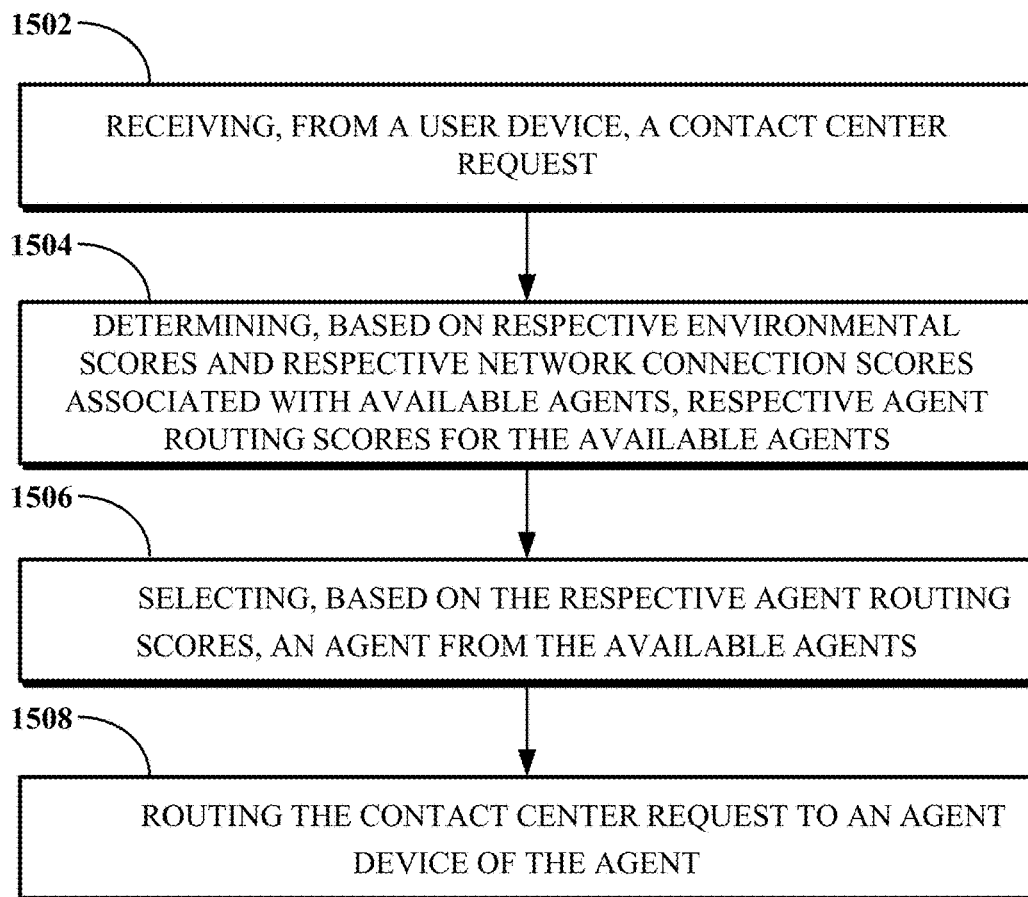
FIG. 15 is a flowchart of an example of a technique for routing contact center requests based agent routing scores.

FIG. 15 is a flowchart of an examples of the technique 1500 for routing contact center requests based agent routing scores. At 1502, a contact center request is received from a user device. At 1504, respective agent routing scores for available agents are determined based on respective environmental scores (i.e., environmental factors) and respective network connection scores associated with available agents. In an example, the respective agent routing scores can be further based on respective agent scores for the available agents.

The respective agent scores can be obtained based on previously completed engagements by the available agents, such as described above with respect to the agent-specific metrics tool 610 of FIG. 6. In an example, the respective agent routing scores can be further based on respective agent scores that may be obtained using a sentiment analysis tool. In an example, the respective agent routing scores can be further based on agent-specific scores that are obtained using evaluation scores determined for the available agents based on engagements completed by the available agents.

In an example, a respective network connection score for an agent can be determined by combining network related metrics to obtain a score that in a range of 0 to a maximum network-related score, such as described with respect to the network-scoring tool 608 of FIG. 6. The network related metrics can be obtained from a network monitoring tool available at the agent device, such as described with respect to the local collector tool 412 of FIG. 4. The network related metrics can include at least one of a packet loss metric, a jitter metric, a throughput metric, or a latency metric.

In an example, a respective environmental score for an agent can be determined based on at least one of a distance between the user device and the agent device or a usage (e.g., load) of a central processing unit (i.e., a processor) of the agent device.

In an example, each respective environmental score can be obtained using first one or more factors and each respective network connection score can be obtained using second one or more factors. A configurating indicating respective weights for each of the first one or more factors and each of the second one or more factors can be received, such as described with respect to the weighting tool 624 of FIG. 6. A respective agent routing score for an agent can be obtained, based on the weights, as a weighted sum of the first one or more factors and the second one or more factors.

At 1506, an agent is selected from the available agents based on the respective agent routing scores. At 1508, the contact center request is routed to an agent device of the agent.

Figure 16:
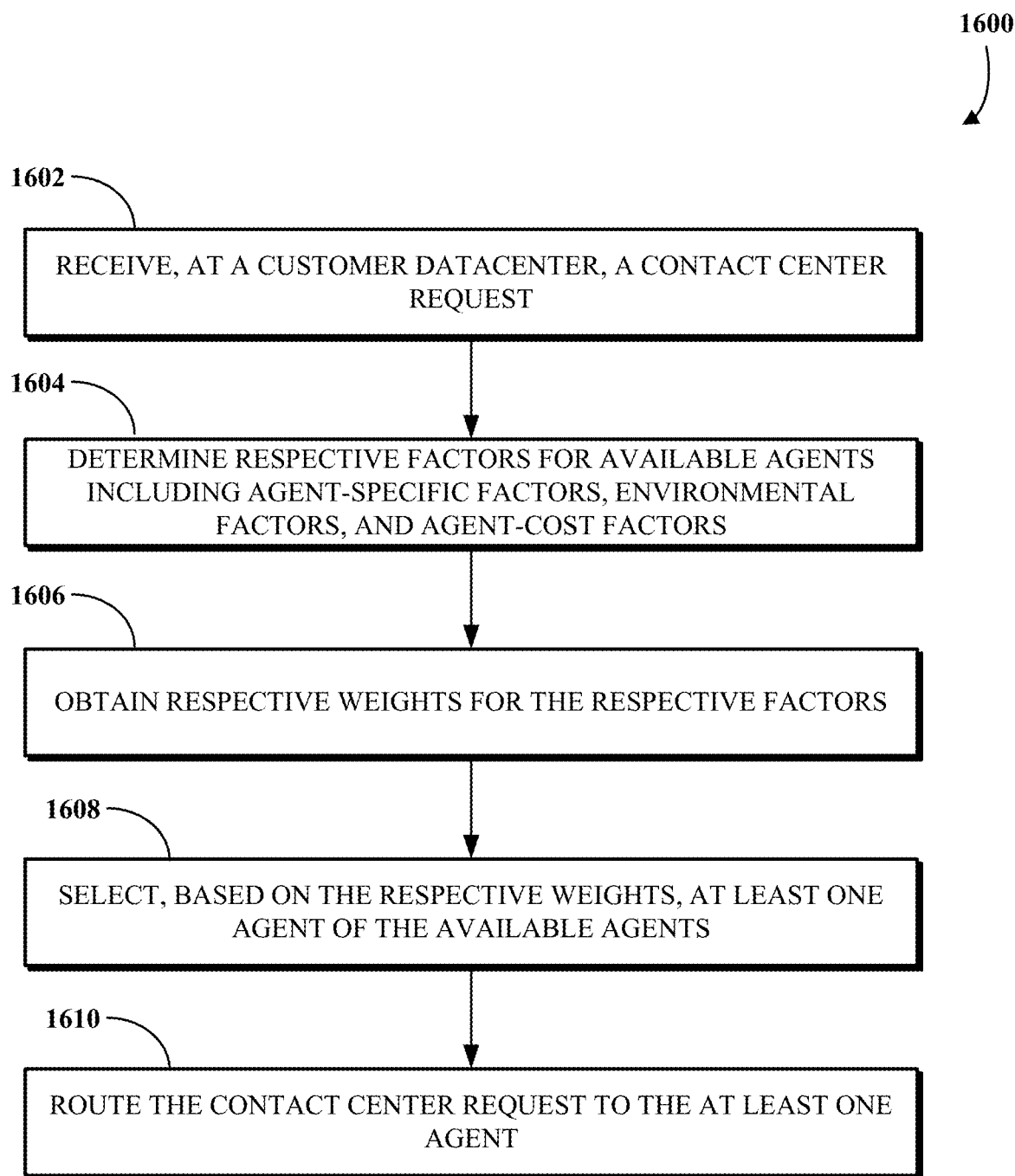
FIG. 16 is a flowchart of an example of a technique for weighting different factors for routing contact center requests.

FIG. 16 is a flowchart of an examples of the technique 1600 for weighting different factors for routing contact center requests. The technique 1600 may be implemented in whole or in part by the weighting tool 624 of FIG. 6.

At 1602, a contact center request is received at a customer datacenter. At 1604, respective factors for available agents are determined. In at example, the respective factors can include at least some of the metrics or factors described with respect to the tools of FIG. 6. In an example, the respective factors can include at least some of the metrics or factors described with respect to FIGS. 11A-11B and shown in the user interfaces 1100 and 1150. As such, the respective factors can include agent-specific factors, environmental factors, and agent-cost factors. In an example, the environmental factors for the available agents can be based on respective physical proximities of agent devices of the available agents to a user device from which the contact center request is received.

At 1604, respective weights for weighting the respective factors are obtained. In an example, the respective weights can be obtained via a user interface, such as one of the user interfaces 1100 and 1150. In an example, the respective weights can be obtained from a machine learning model, such as described with respect to the ML weighting tool 622 of FIG. 6. In an example, and as described with respect to FIG. 11B, machine-learning weights output by a machine-learning model may be presented in a user interface and an indication of whether to use one of the machine-learning weights for one of the respective weights can be obtained.

At 1606, at least one agent of the available agents is selected based on the respective weights. The respective weights can be used in a weighting function (e.g., model) to obtain a ranking or tiering of the available agents. The ranking or tiering of the available agents can be used to select at least at least of the agents to route the contact center request to. In an example, the at least one agent of the available agents can be further selected based on a skill required for the contact center request.

At 1608, the contact center request is routed to the at least one agent. That is, the device of the one agent is connected to the user device therewith creating an engagement between the user and the agent.

Figure 17:
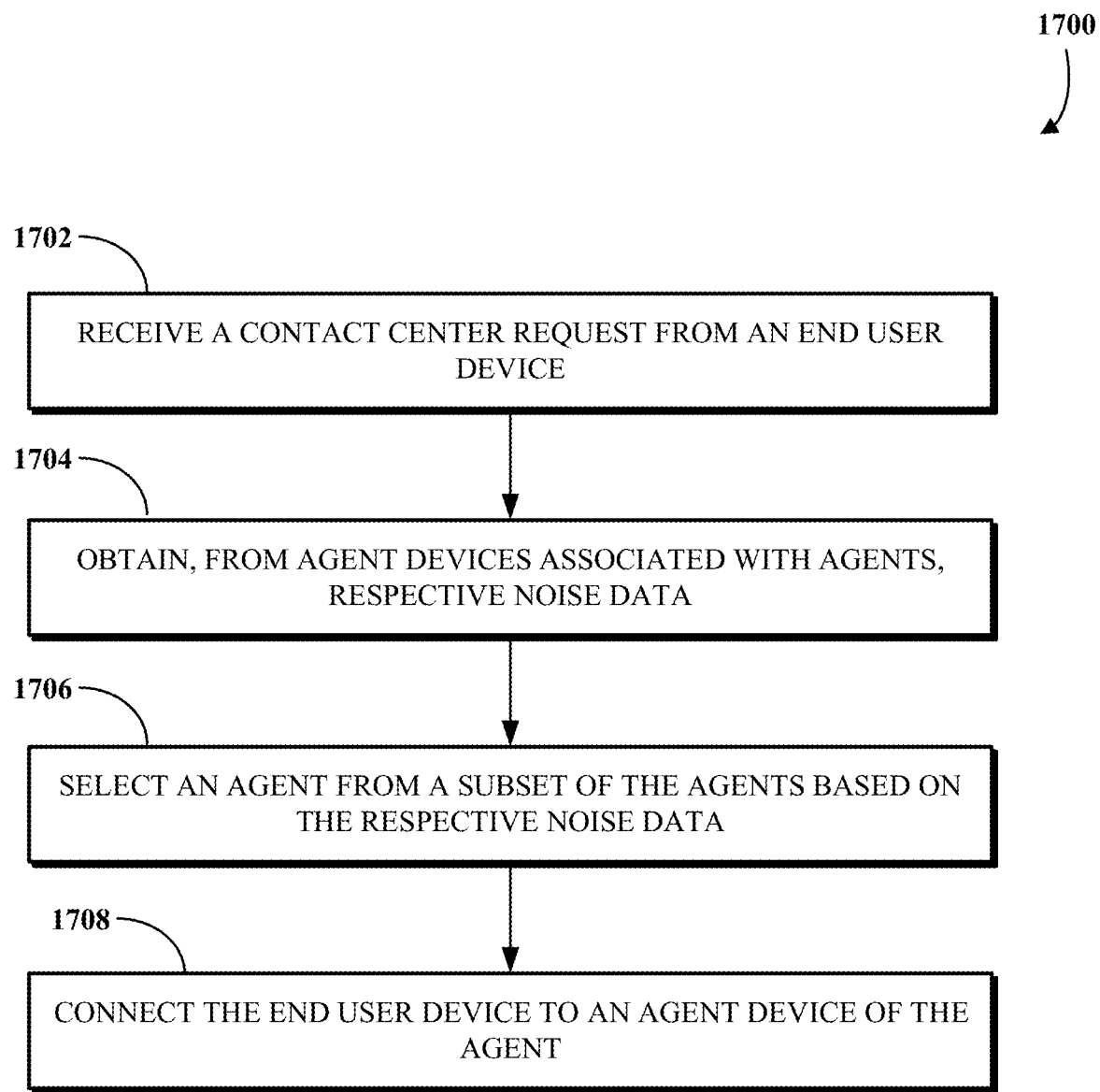
FIG. 17 is a flowchart of an example of a technique for routing contact center requests based on noise data obtained from agent devices.

FIG. 17 is a flowchart of an examples of the technique 1700 for routing contact center requests based on noise data obtained from agent devices. At 1702, a contact center request is received from an end user device. At 1704, respective noise data are obtained from agent devices associated with agents. The noise data received from an agent device can be received by the device-characteristics tool 612 of FIG. 6 from a local collector available at the agent device, such as the local collector tool 412 of FIG. 4. In an example, the respective noise data can be obtained from the agent devices in response to completion, by the agents, of respective engagements.

At 1706, an agent is selected from a subset of the agents based on the respective noise data. In an example, the agent can be further selected based on a modality associated with the contact center request. At 1708, the end user device is connected to an agent device of the agent.

In an example, if a noise level associated with one agent of the agents exceeds a threshold noise level, then the one agent can be excluded from the subset of the agents. That is, the agent is not available for possible selection at 1706. In an example, if it is determined for one of the agents that a noise frequency exceeds a threshold noise frequency, then whether to include the one agent in the subset of the agents (i.e., whether the one agent is available for selection at 1706) can be based on a modality associated with the contact center request.

In an example, if a noise frequency associated with one agent of the agents exceeds a threshold frequency level, then the one agent may be associated with (e.g., assigned to) a contact center queue associated with a chat-only modality. In an example, if a noise frequency associated with one agent of the agents persists for predefined period of time, a notification of the noise frequency can be transmitted to at least one of the one agent or a supervisor of the one agent.

For simplicity of explanation, the techniques 1200-1700 of FIGS. 12-17, respectively, are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that includes receiving, from a user device, a contact center request; determining, based on respective environmental scores and respective network connection scores associated with available agents, respective agent routing scores for the available agents; selecting, based on the respective agent routing scores, an agent from the available agents; and routing the contact center request to an agent device of the agent. Other embodiments of this aspect include corresponding computer systems, apparatus, and computer programs recorded on one or more computer storage devices, each configured to perform the actions of the methods.

Implementations may include one or more of the following features. The methods where determining, based at least on the respective environmental scores and the respective network connection scores associated with the available agents, the respective agent routing scores for the available agents may include determining a respective network connection score for the agent by: obtaining, from a network monitoring tool available at the agent device, network related metrics including at least one of a packet loss metric, a jitter metric, a throughput metric, or a latency metric; and combining the network related metrics to obtain a score that in a range of 0 to a maximum network-related score. The method where determining, based at least on the respective environmental scores and the respective network connection scores associated with the available agents, the respective agent routing scores for the available agents may include determining a respective environmental score for the agent based on at least one of a distance between the user device and the agent device or a usage of a central processing unit of the agent device. The method where the respective agent routing scores are further based on respective agent scores for the available agents, where the respective agent scores can be obtained based on previously completed engagements by the available agents. The method where the respective agent routing scores can be based on respective agent scores for the available agents, where the respective agent scores can be obtained using a sentiment analysis tool. The method where each respective environmental score can be obtained using first one or more factors, and where each respective network connection score can be obtained using second one or more factors, may include: receiving a configurating indicating respective weights for each of the first one or more factors and each of the second one or more factors; and obtaining, using the respective weights, a respective agent routing score as a weighted sum of the first one or more factors and the second one or more factors. The method where the respective agent routing scores can be based on agent-specific scores that are obtained using evaluation scores determined for the available agents based on engagements completed by the available agents. Implementations of the described techniques may include hardware, a method or process, or computer software on a computer-accessible medium.

One general aspect includes a device that includes a memory and a processor. The processor can be configured to execute instructions stored in the memory to receive, from a user device, a contact center request; determine, based on respective environmental scores and respective network connection scores associated with available agents, respective agent routing scores for the available agents; select, based on the respective agent routing scores, an agent from the available agents; and route the contact center request to an agent device of the agent. Other embodiments of this aspect include corresponding computer systems, apparatus, and computer programs recorded on one or more computer storage devices, each configured to perform the actions of the methods.

Implementations may include one or more of the following features. The device where the instructions to determine, based at least on the respective environmental scores and the respective network connection scores associated with the available agents, the respective agent routing scores for the available agents may include instructions to determine a respective network connection score for the agent by instructions to obtain, from a network monitoring tool available at the agent device, network related metrics including at least one of a packet loss metric, a jitter metric, a throughput metric, or a latency metric; and combine the network related metrics to obtain a score that in a range of 0 to a maximum network-related score. The device where the instructions to determine, based at least on the respective environmental scores and the respective network connection scores associated with the available agents, the respective agent routing scores for the available agents may include instructions to determine a respective environmental score for the agent based on at least one of a distance between the user device and the agent device or a usage of a central processing unit of the agent device. The device where the respective agent routing scores can be based on respective agent scores for the available agents, where the respective agent scores are obtained based on previously completed engagements by the available agents. The device where the respective agent routing scores can be based on respective agent scores for the available agents, where the respective agent scores can be obtained using a sentiment analysis tool. The device where each respective environmental score can be obtained using first one or more factors, and where each respective network connection score can be obtained using second one or more factors, the processor can be configured to execute instructions stored in the memory to receive a configurating indicating respective weights for each of the first one or more factors and each of the second one or more factors; and obtain, using the respective weights, a respective agent routing score as a weighted sum of the first one or more factors and the second one or more factors. The device where the respective agent routing scores can be based on agent-specific scores that are obtained using evaluation scores determined for the available agents based on engagements completed by the available agents. Implementations of the described techniques may include hardware, a method or process, or computer software on a computer-accessible medium.

One general aspect includes a non-transitory computer readable medium storing instructions operable to cause one or more processors to perform operations that include receiving, from a user device, a contact center request; determining, based on respective environmental scores and respective network connection scores associated with available agents, respective agent routing scores for the available agents; selecting, based on the respective agent routing scores, an agent from the available agents; and routing the contact center request to an agent device of the agent. Other embodiments of this aspect include corresponding computer systems, apparatus, and computer programs recorded on one or more computer storage devices, each configured to perform the actions of the methods.

Implementations may include one or more of the following features. The non-transitory computer readable where determining, based at least on the respective environmental scores and the respective network connection scores associated with the available agents, the respective agent routing scores for the available agents may include determining a respective network connection score for the agent by obtaining, from a network monitoring tool available at the agent device, network related metrics including at least one of a packet loss metric, a jitter metric, a throughput metric, or a latency metric; and combining the network related metrics to obtain a score that in a range of 0 to a maximum network-related score. The non-transitory computer readable medium where determining, based at least on the respective environmental scores and the respective network connection scores associated with the available agents, the respective agent routing scores for the available agents may include determining a respective environmental score for the agent based on at least one of a distance between the user device and the agent device or a usage of a central processing unit of the agent device. The non-transitory computer readable medium where the respective agent routing scores can be based on respective agent scores for the available agents, where the respective agent scores can be obtained based on previously completed engagements by the available agents. The non-transitory computer readable medium where the respective agent routing scores are further based on respective agent scores for the available agents, where the respective agent scores can be obtained using a sentiment analysis tool. The non-transitory computer readable medium where each respective environmental score can be obtained using first one or more factors, and where each respective network connection score can be obtained using second one or more factors, and the operations can include receiving a configurating indicating respective weights for each of the first one or more factors and each of the second one or more factors; and obtaining, using the respective weights, a respective agent routing score as a weighted sum of the first one or more factors and the second one or more factors. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, from a user device, a contact center request;
   determining, based on respective environmental scores and respective network connection scores associated with available agents, respective agent routing scores for the available agents,
   wherein each respective environmental score is obtained using first one or more factors, and
   wherein each respective network connection score is obtained using second one or more factors, further comprising:
   receiving a configurating indicating respective weights for each of the first one or more factors and each of the second one or more factors; and
   obtaining, using the respective weights, a respective agent routing score as a weighted sum of the first one or more factors and the second one or more factors;
   grouping the available agents into tiers based on the respective agent routing scores;
   selecting, based on the tiers, an agent from the available agents; and
   routing the contact center request to an agent device of the agent.

2. The method of claim 1, wherein determining, based on the respective environmental scores and the respective network connection scores associated with the available agents, the respective agent routing scores for the available agents comprises:
    determining a respective network connection score for the agent by:
        obtaining, from a network monitoring tool available at the agent device, network related metrics including at least one of a packet loss metric, a jitter metric, a throughput metric, or a latency metric; and
        combining the network related metrics to obtain a score that is in a range of 0 to a maximum network-related score.

3. The method of claim 1, wherein the respective environmental score for one of the available agents is further determined based on a usage of a central processing unit of the agent device of the available agent.

4. The method of claim 1, wherein the respective agent routing scores are further based on respective agent scores for the available agents, wherein the respective agent scores are obtained based on previously completed engagements by the available agents.

5. The method of claim 1, wherein the respective agent routing scores are further based on respective agent scores for the available agents, wherein the respective agent scores are obtained using a sentiment analysis tool.

6. The method of claim 1, wherein a respective environmental score for an available agent with respect to the contact center request is determined based on a distance between the user device and an agent device of the available agent.

7. The method of claim 1, wherein the respective agent routing scores are further based on agent-specific scores that are obtained using evaluation scores determined for the available agents based on engagements completed by the available agents.

8. A device, comprising:
    a memory; and
    a processor, the processor configured to execute instructions stored in the memory to:
        receive, from a user device, a contact center request;
        determine, based on respective environmental scores and respective network connection scores associated with available agents, respective agent routing scores for the available agents,
            wherein each respective environmental score is obtained using first one or more factors, and
            wherein each respective network connection score is obtained using second one or more factors, the processor further configured to execute instructions stored in the memory to:
                receive a configurating indicating respective weights for each of the first one or more factors and each of the second one or more factors; and
                obtain, using the respective weights, a respective agent routing score as a weighted sum of the first one or more factors and the second one or more factors;
        group the available agents into tiers based on the respective agent routing scores;
        select, based on the tiers, an agent from the available agents; and
        route the contact center request to an agent device of the agent.

9. The device of claim 8, wherein the instructions to determine, based on the respective environmental scores and the respective network connection scores associated with the available agents, the respective agent routing scores for the available agents comprise instructions to:
    determine a respective network connection score for the agent by instructions to:
        obtain, from a network monitoring tool available at the agent device, network related metrics including at least one of a packet loss metric, a jitter metric, a throughput metric, or a latency metric; and
        combine the network related metrics to obtain a score that is in a range of 0 to a maximum network-related score.

10. The device of claim 8, wherein the respective environmental score for one of the available agents is further based on a usage of a central processing unit of the agent device of the available agent.

11. The device of claim 8, wherein the respective agent routing scores are further based on respective agent scores for the available agents, wherein the respective agent scores are obtained based on previously completed engagements by the available agents.

12. The device of claim 8, wherein the respective agent routing scores are further based on respective agent scores for the available agents, wherein the respective agent scores are obtained using a sentiment analysis tool.

13. The device of claim 8, wherein a respective environmental score for an available agent with respect to the contact center request is determined based on a distance between the user device and an agent device of the available agent.

14. The device of claim 8, wherein the respective agent routing scores are further based on agent-specific scores that are obtained using evaluation scores determined for the available agents based on engagements completed by the available agents.

15. A non-transitory computer readable medium storing instructions operable to cause one or more processors to perform operations comprising:
    receiving, from a user device, a contact center request;
    determining, based on respective environmental scores and respective network connection scores associated with available agents, respective agent routing scores for the available agents,
        wherein each respective environmental score is obtained using first one or more factors, and
        wherein each respective network connection score is obtained using second one or more factors, further comprising:
            receiving a configurating indicating respective weights for each of the first one or more factors and each of the second one or more factors; and
            obtaining, using the respective weights, a respective agent routing score as a weighted sum of the first one or more factors and the second one or more factors;
    grouping the available agents into tiers based on the respective agent routing scores;
    selecting, based on the tiers, an agent from the available agents; and
    routing the contact center request to an agent device of the agent.

16. The non-transitory computer readable medium of claim 15, wherein determining, based on the respective environmental scores and the respective network connection scores associated with the available agents, the respective agent routing scores for the available agents comprises:
    determining a respective network connection score for the agent by:

obtaining, from a network monitoring tool available at the agent device, network related metrics including at least one of a packet loss metric, a jitter metric, a throughput metric, or a latency metric; and combining the network related metrics to obtain a score that is in a range of 0 to a maximum network-related score.

17. The non-transitory computer readable medium of claim 15, wherein the respective environmental score for one of the available agents is further based on a usage of a central processing unit of the agent device of the available agent.

18. The non-transitory computer readable medium of claim 15, wherein the respective agent routing scores are further based on respective agent scores for the available agents, wherein the respective agent scores are obtained based on previously completed engagements by the available agents.

19. The non-transitory computer readable medium of claim 15, wherein the respective agent routing scores are further based on respective agent scores for the available agents, wherein the respective agent scores are obtained using a sentiment analysis tool.

20. The non-transitory computer readable medium of claim 15, wherein a respective environmental score for an available agent with respect to the contact center request is determined based on a distance between the user device and an agent device of the available agent.

* * * * *